(12) United States Patent
Krishnan et al.

(10) Patent No.: US 11,462,195 B2
(45) Date of Patent: Oct. 4, 2022

(54) DYNAMICALLY TRANSITIONING BETWEEN VISUAL MEDIA ITEMS AT A DIGITAL-CONTENT-DISPLAY DEVICE

(71) Applicant: Adobe Inc., San Jose, CA (US)

(72) Inventors: Kalyanaraman Balasubramaniam Krishnan, Milpitas, CA (US); Gilbert Pierre-Louis, Oakland, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/876,487

(22) Filed: May 18, 2020

(65) Prior Publication Data
US 2021/0358456 A1 Nov. 18, 2021

(51) Int. Cl.
*G09G 5/37* (2006.01)
*G06F 3/14* (2006.01)

(52) U.S. Cl.
CPC ............... *G09G 5/37* (2013.01); *G06F 3/14* (2013.01); *G09G 2354/00* (2013.01)

(58) Field of Classification Search
None
See application file for complete search history.

(56) References Cited

U.S. PATENT DOCUMENTS

| 2010/0281376 | A1* | 11/2010 | Meaney | G11B 27/34 |
| | | | | 715/723 |
| 2012/0314021 | A1* | 12/2012 | Tsang | H04N 5/89 |
| | | | | 348/40 |
| 2014/0298170 | A1* | 10/2014 | Mercilie | G11B 27/105 |
| | | | | 715/716 |

* cited by examiner

*Primary Examiner* — Edward Martello
(74) *Attorney, Agent, or Firm* — Keller Preece PLLC

(57) ABSTRACT

This disclosure describes a digital-content-transition system that dynamically determines a content-transition type for a visual media transition and converts a display of a digital-content-display device from one visual media item to another visual media item according to the content-transition type. For example, the digital-content-transition system can intelligently determine a type and time of transition from multiple content-transition types and content-transition times for transitioning between visual media items or visual media collections displayed at a digital-content-display device. By intelligently determining a content-transition type and a corresponding content-transition time based on metadata of the visual media items, the digital-content-transition system can transition a display of the digital-content-display device between visual media items or visual media collections according to the content-transition type and content-transition time.

20 Claims, 16 Drawing Sheets

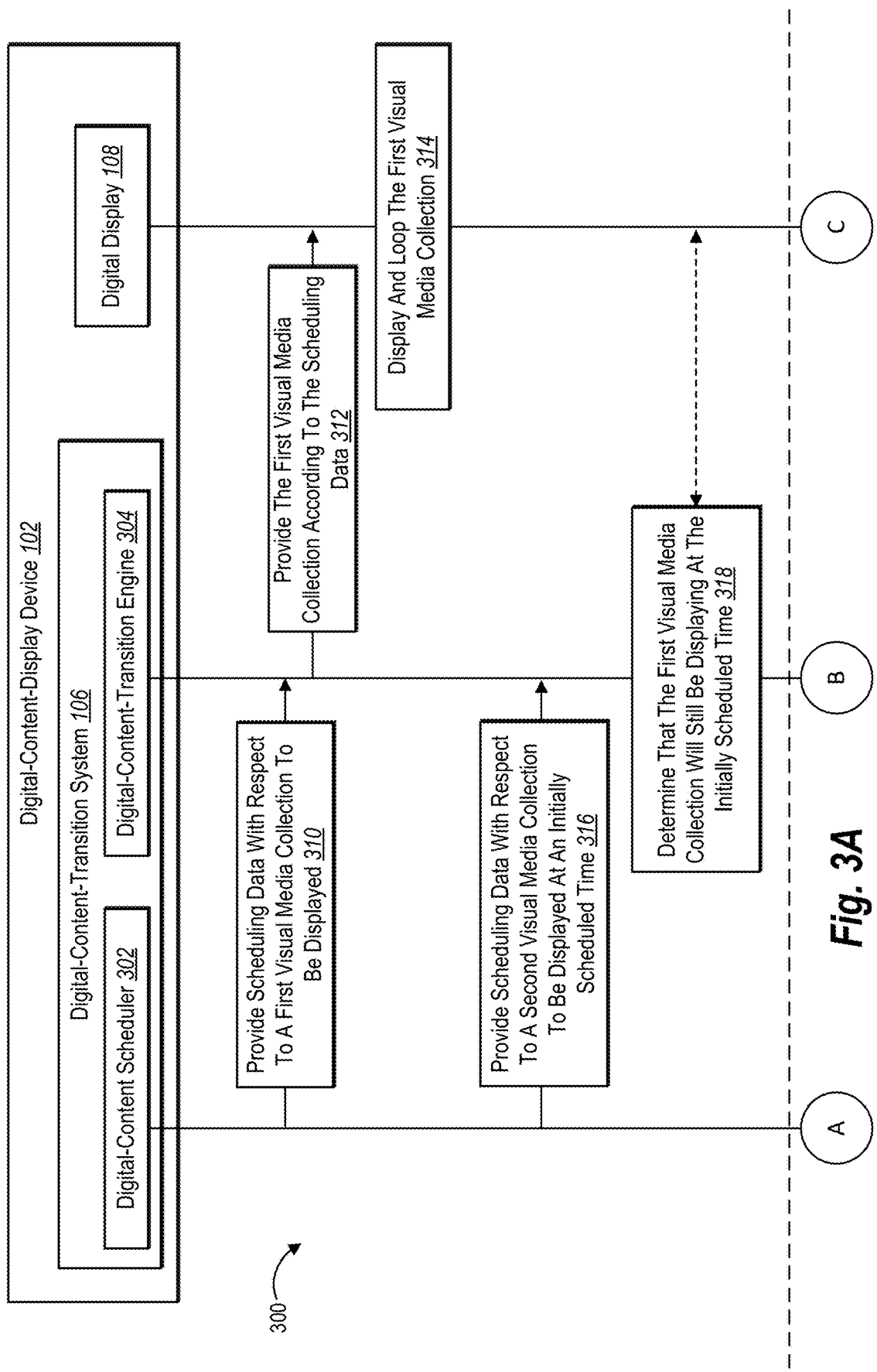

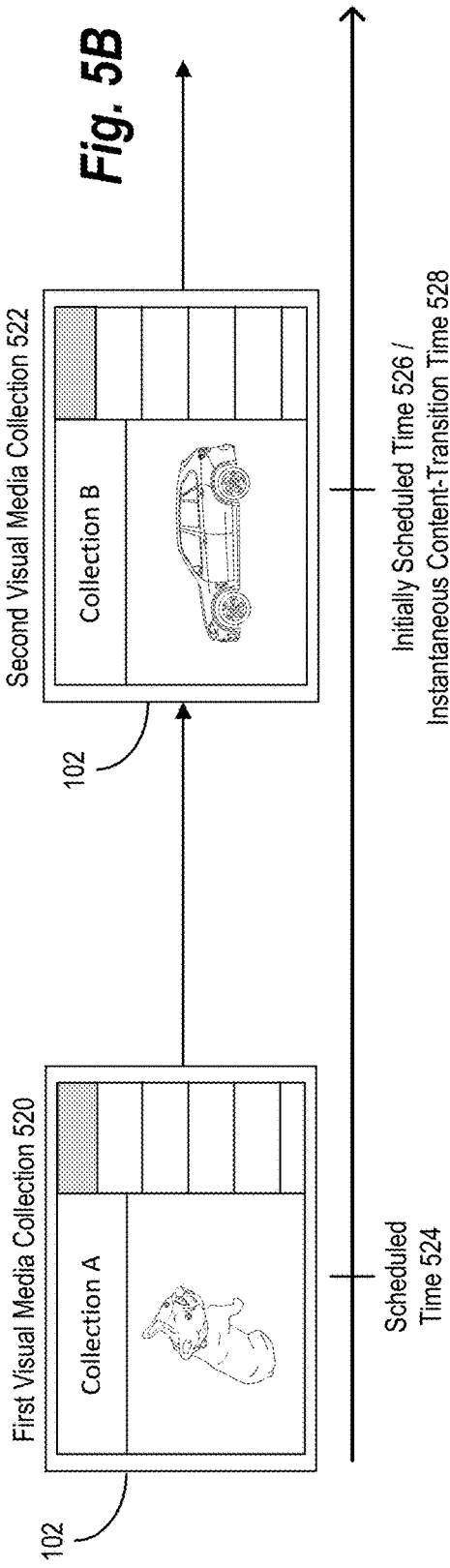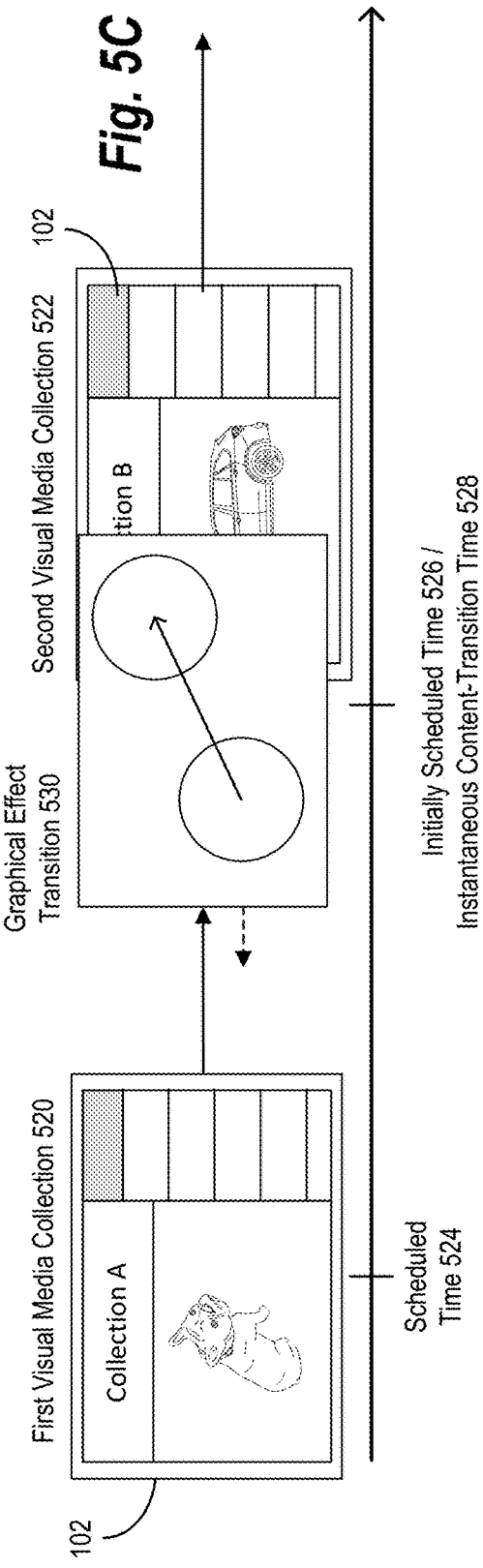

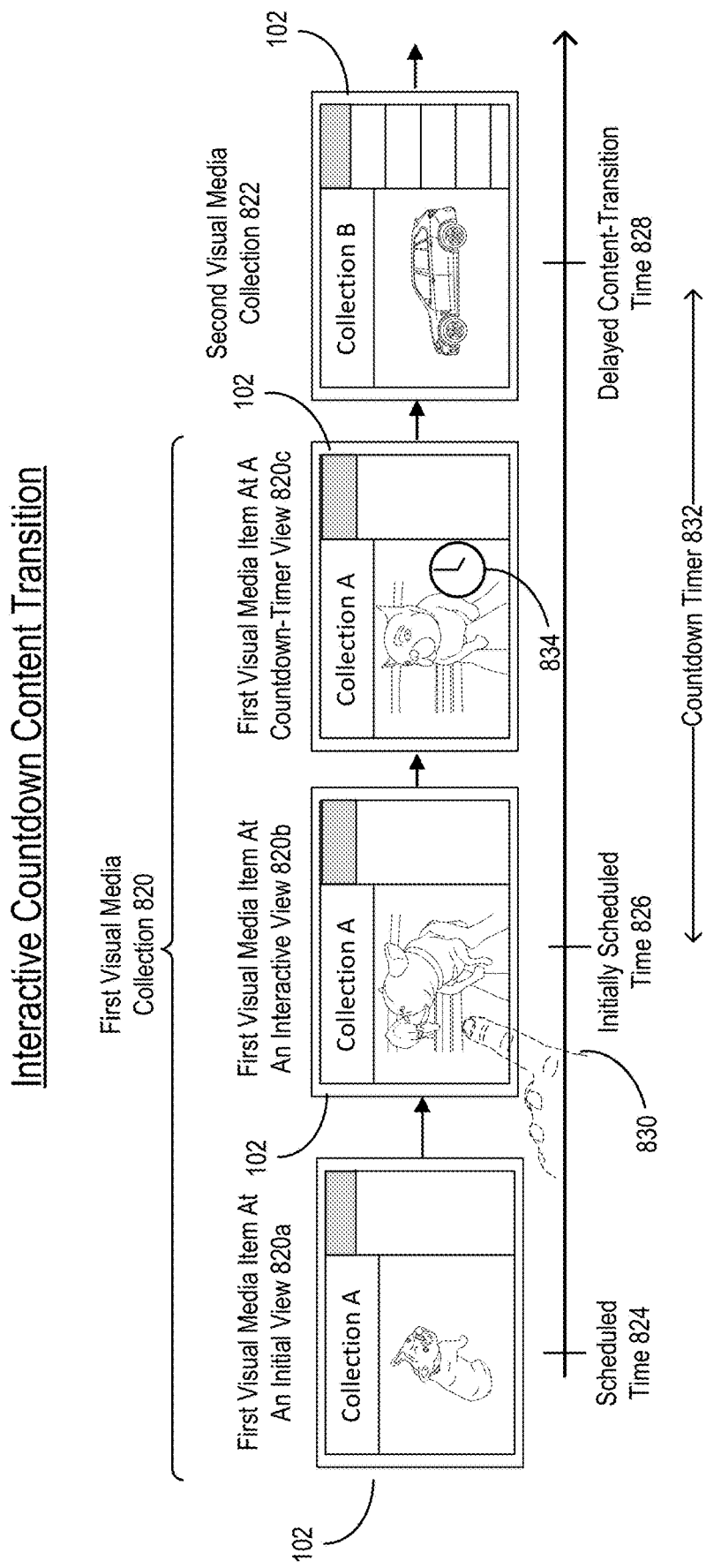

DYNAMICALLY TRANSITIONING BETWEEN VISUAL MEDIA ITEMS AT A DIGITAL-CONTENT-DISPLAY DEVICE

BACKGROUND

In recent years, both hardware and software have improved the display of visual content on digital signs, such as digital billboards, marquees, menu boards, kiosks, and more. For example, conventional systems can utilize digital signs to publish digital content for individuals viewing the content to experience. Occasionally, a digital sign can display interactive digital content.

In addition to displaying individual content, many conventional systems provide digital signs with a playlist of digital content. Often, a digital sign loops through the playlist of digital content until starting a new playlist. In some instances, conventional systems cycle through multiple playlists, where each playlist is scheduled to play at a certain time. For example, a restaurant creates a playlist for breakfast, lunch, and dinner, and the restaurant uses a digital sign (e.g., a digital menu board) to show each playlist at scheduled times corresponding to breakfast, lunch, and dinner hours, respectively.

Notwithstanding these improvements in the field of digital signage, conventional systems often transition between displaying digital content on digital signs using rigid and inefficient takeovers and abruptly cutoff digital content during display. Indeed, as further provided below, conventional systems adhere to rigid takeover restrictions when changing between one or both of playlists and digital content, which, in turn, causes inflexible and inefficient use of display interfaces or memory.

BRIEF SUMMARY

This disclosure describes one or more implementations of systems, non-transitory computer-readable media, and methods that solve one or more of the foregoing problems and provide other benefits. In some cases, the disclosed systems dynamically determine a content-transition type for a visual media transition and convert a display of a digital-content-display device from one visual media item to another visual media item according to the content-transition type. In particular, the disclosed systems can intelligently determine a type and time of transition from multiple content-transition types and content-transition times for transitioning between visual media items or visual media collections displayed at a digital-content-display device. By intelligently determining a content-transition type and a corresponding content-transition time based on metadata of the visual media items, the disclosed systems can transition a display of the digital-content-display device between visual media items or visual media collections according to the content-transition type and content-transition time.

The following description sets forth additional features and advantages of one or more implementations of the disclosed systems, computer media, and methods.

BRIEF DESCRIPTION OF THE DRAWINGS

The detailed description provides one or more implementations with additional specificity and detail through the use of the accompanying drawings, as briefly described below.

FIGS. 3A-3B illustrates a sequence diagram of determining a content-transition type and a corresponding content-transition time for transitioning from a first visual media collection to a second visual media collection in accordance with one or more implementations.

FIG. 5B illustrates a schematic diagram of a timeline for utilizing an instantaneous content transition at a digital-content-display device in accordance with one or more implementations.

FIG. 5C illustrates a schematic diagram of a timeline for utilizing a graphical effect transition at a digital-content-display device in accordance with one or more implementations.

FIG. 8B illustrates a schematic diagram of a timeline for utilizing another interactive content transition at a digital-content-display device in accordance with one or more implementations.

DETAILED DESCRIPTION

Figure 1:
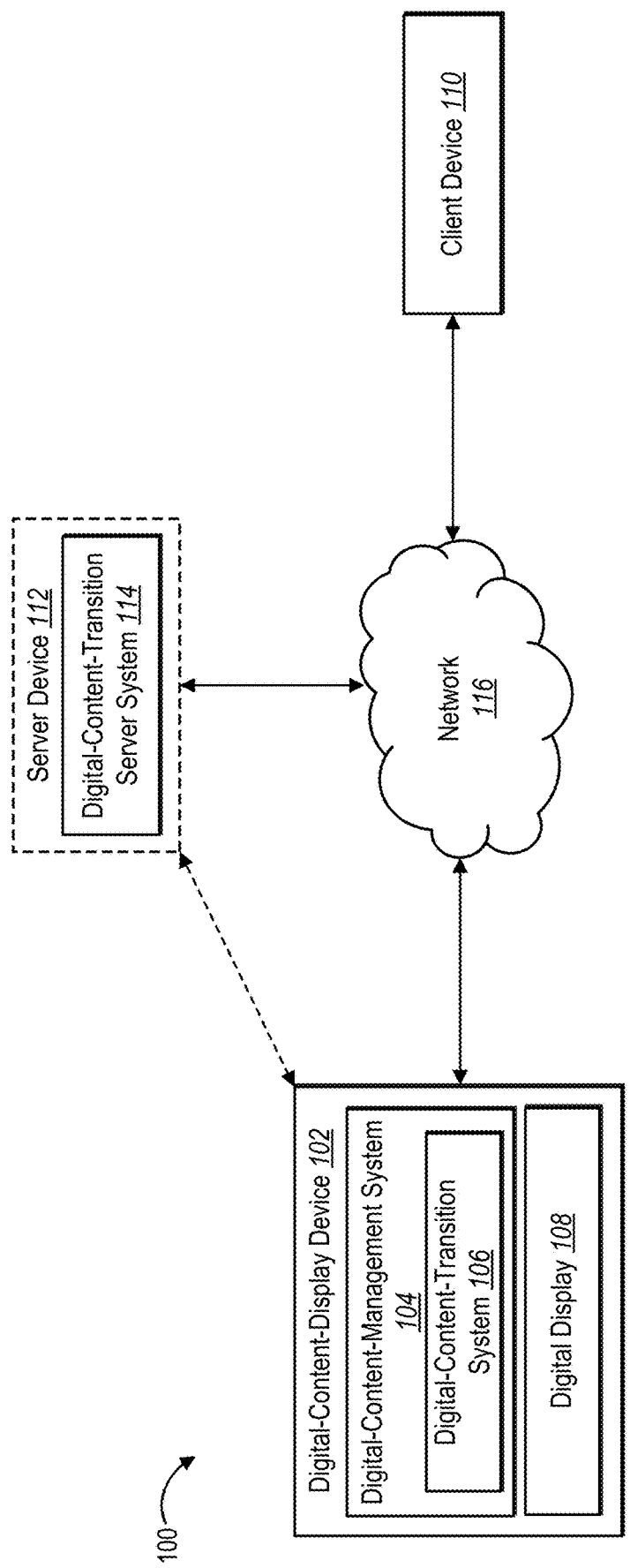
FIG. 1 illustrates a schematic diagram of a system environment in which a digital-content-transition system can operate in accordance with one or more implementations.

This disclosure describes one or more implementations of a digital-content-transition system that dynamically determines and applies content-transition types and content-transition times for converting between visual media items at a digital-content-display device. For example, the digital-content-transition system identifies multiple content-transition types for transitioning or converting between visual media items or visual media collections at a digital-content-display device. Based on the determined content-transition type, the digital-content-transition system can dynamically determine in real or near-real time a content-transition time to apply the content-transition type to transition between visual media items in, for instance, a smooth or seamless way.

More specifically, in one or more implementations, the digital-content-transition system displays a first visual media item at a digital-content-display device. While the first visual media item is being displayed, the digital-content-transition system determines that a second visual media item is scheduled to start displaying at the digital-content-display device before the first visual media item finishes displaying. Based on this determination, the digital-content-transition system further determines a content-transition type from a set of content-transition types and, based on the content-transition type, determine a content-transition time. The digital-content-transition system further converts the display at the content-transition time according to the content-transition type from the first visual media item to the second visual media item.

As mentioned above, the digital-content-transition system can display visual media items at a digital-content-display device. For example, a digital-content-display device can include various digital display devices such as a digital billboard, a digital marquee, a digital kiosk, a digital menu board, or a large monitor. Additionally, the digital-content-display device can display various visual media items, such as videos, images, or animations.

As also mentioned above, the digital-content-transition system can determine that a second visual media item is scheduled to be displayed at a digital-content-display device before the first visual media item finishes displaying. For instance, in one or more implementations, the digital-content-transition system receives scheduling data that indicates an initially scheduled time to display the second visual media item. Further, as described below, the digital-content-transition system can determine that the first visual media item will still be displaying at the initially scheduled time. Accordingly, the digital-content-transition system can determine whether to delay displaying the second visual media item and/or how to transition from the first visual media item to the second visual media item.

To illustrate, the digital-content-transition system can determine a content-transition type from a set of content-transition types. For instance, in one or more implementations, the digital-content-transition system determines to utilize a delayed content transition, which can include waiting for the first visual media item or a visual media collection to finish displaying before transitioning the digital-content-display device to display the second visual media item. In some implementations, the digital-content-transition system determines to utilize an interactive content transition, which can include providing extra time (e.g., a time buffer) to a user interacting with the first visual media item before displaying the second visual media item.

Additionally, in various implementations, the digital-content-transition system determines to utilize an instantaneous content transition, which can include displaying the second visual media item at the initially scheduled time based on the second visual media item including time-sensitive content. Further, in example implementations, the digital-content-transition system determines to utilize a graphical effect transition, which can add a graphical effect, such as an animation, a graphic, or a third visual media item, in connection with transitioning from the first visual media item to the second visual media item at the digital-content-display device.

As mentioned above, the digital-content-transition system can determine a content-transition time. In various implementations, the digital-content-transition system determines the content-transition time based on one or both of media-item metadata and real-time display/interaction data associated with a first visual media item. In various implementations, the content-transition time can correspond to the initially scheduled time (e.g., an instantaneous content-transition time) or can be after the initially scheduled time (e.g., a delayed content-transition time).

As also mentioned above, the digital-content-transition system can utilize the determined content-transition type to dynamically determine a content-transition time of when to transition the display at the digital-content-display device to the second visual media item. For example, based on selecting the delayed content transition, the digital-content-transition system can determine a delayed content-transition time that identifies (as the content-transition time) when the first visual media item will finish displaying at the digital-content-display device. As another example, based on selecting the interactive content transition, the digital-content-transition system can determine a delayed content-transition time that identifies (as the content-transition time) when a user finishes interacting with the first visual media item (e.g., based on detecting an idle period) and/or expires (e.g., based on an interactive countdown timer elapsing).

As an additional example, based on selecting the instantaneous content transition, the digital-content-transition system can determine an instantaneous content-transition time that identifies the initially scheduled time as the content-transition time. Further, in various implementations, based on selecting the graphical effect transition and depending on the type of graphical effect, the digital-content-transition system can determine an instantaneous content-transition time or a delayed content-transition time for displaying the second visual media item, as further described below.

As mentioned above, conventional systems rigidly and inefficiently transition and display digital content on digital signs and cuts off portions of digital content. To illustrate, as noted above, conventional systems use predetermined scheduling to switch between playlists of digital content. Accordingly, when the scheduled time comes to play a new playlist or new digital media content, conventional systems send the new playlist to the digital sign, which abruptly stops playing the current playlist and begins to play the new playlist. This abrupt takeover of a new playlist or a new piece of digital content, which often cuts off the digital content currently being displayed, has caused problems in the field of digital signage.

In particular, conventional systems inflexibly switch between digital media playlists. Specifically, conventional systems often abruptly transition when switching between playlists of digital content or pieces of digital content. In some cases, the abrupt takeover causes confusion. If a viewer is interacting with the digital content, the abrupt takeover interrupts their experience without warning. In some instances, any work performed by the interactive viewer is lost and cannot be recovered.

By abruptly transition between digital content, conventional systems often cutoff or truncate digital content. To illustrate, when a piece of digital content is cut off due to an abrupt takeover to display a new playlist or a new piece of digital content at a digital sign, a conventional digital sign fails to display part of the digital content. Indeed, critical information, which is often provided at the end of the piece of digital content, is not provided to viewers because it has been abruptly removed.

Further, conventional systems can apply transitions that inefficiently use or disrupt user data saved on the memory of a digital signage. For instance, as mentioned above, when a viewer is currently engaging with interactive content that is abruptly cut off, work performed by the viewer is often lost and cannot be recovered. Indeed, because the experience has often changed on the digital sign, the viewer cannot return or restart the interactive process. Alternatively, if the user can restart the interactive process, the digital sign must often reload the interactive experience (e.g., the piece of digital content) and the viewer must redo all of the work they previously perform, which inefficiently drains the computing resources of the digital sign and/or other computing devices. Moreover, when conventional systems provide incomplete and inaccurate digital content, as noted above, the conventional system further wastes computer processing resources and real-time memory.

As previously mentioned, the digital-content-transition system provides numerous advantages and benefits over conventional systems via a practical application. For example, in some cases, the digital-content-transition system improves the abrupt and rigid transitions of conventional digital displays. Rather than the abrupt transition between visual media, the digital-content-transition system can intelligently determine to apply a content-transition type from multiple content transition types based on the metadata or real-time-display data of a digital-content-display device. In contrast to the abrupt and rigid graphical transitions of convention, the digital-content-transition system can determine to apply one or more of an instantaneous content transition, a delayed content transition, an interactive content transition, or a graphical effect transition based on metadata from the visual media indicating a content publisher's preference or selection. Such an intelligent transition not only solves the problem of abrupt transitions, but also introduces a degree of flexibility and control over a specialized graphical user interface that conventional digital signage lacks.

In addition to intelligent graphical transitions, the digital-content-transition system implements real-time and dynamic transitions (e.g., conversions) from one visual media item (or visual media collection) to another visual media item (or another visual media collection). Specifically, the digital-content-transition system regularly determines a content-transition type and a content-transition time, often in real time or near-real time, to determine how to efficiently transition between visual media items and/or visual media collections. Indeed, due to the changing nature of visual media items and visual media collections as well as the interactive nature of these items, the digital-content-transition system must frequently determine which content-transition type to utilize, determine when to trigger the transition (e.g., the content-transition time), as well as facilitate the transition of digital content at a digital document in real time or near-real time to ensure, for instance, a smooth, natural, and seamless transition.

Beyond dynamic and contemporaneous transitions, in some cases, the digital-content-transition system improves the efficiency with which digital signs transition and preserve user-interaction data. To illustrate, in various implementations, the digital-content-transition system minimizes, and often eliminates, the loss or duplication of data by dynamically controlling when transitions between visual media items and visual media collections occur. Indeed, a viewing user interacting with a visual media item at a digital-content-display device is not abruptly cut off from their experience as with conventional systems. Rather, the digital-content-transition system detects the interaction at the digital-content-display device and determines a content-transition type that preserves the data and work of the interacting viewer. In this manner, the digital-content-transition system prevents the inefficient drains of computing resources that occur with conventional systems as well as reduces computer processing resources and real-time memory at one or more computing devices.

Additional advantages and benefits of the digital-content-transition system will become apparent in view of the following description. Further, as illustrated by the foregoing discussion, the present disclosure utilizes a variety of terms to describe the features and advantages of the digital-content-transition system. Before describing the digital-content-transition system with reference to the figures, additional detail is now provided regarding the meaning of such terms.

As used herein, the term "digital-content-display device" (or simply "display device") refers to a computing device that displays collections of digital content or individual digital content items. In particular, a digital-content-display device can include a computing device having a digital display for displaying and/or playing visual media items according to a particular order. In some implementations, a digital-content-display device can house and implement the digital-content-transition system. In alternative implementations, a digital-content-display device can be located remotely from the digital-content-transition system and can display visual media items upon receiving them from the digital-content-transition system. In some implementations, a digital-content-display device upon receiving a display command from the digital-content-transition system to display the visual media or, alternatively, upon receiving the visual media.

The term "visual media item," as used herein, refers to a digital image or a series of digital images. A visual media item can include still digital images, digital videos, gifs, or other visual digital media. In particular, a visual media item can include a digital video or digital image stored in a digital file that is transferable between computing devices as well as displayable at a digital-content-display device. In various implementations, a visual media item includes digital content of a set duration. For example, a video visual media item displays or plays for the duration of the video. Similarly, an image can be associated with a duration of time (e.g., a minimum display time and/or a total display time) the image is to be displayed at a digital-content-display device.

In addition, a visual media item or a corresponding digital file can include media-item data that describe the characteristics and attributes of the visual media item. Examples of media-item data include, but are not limited to, information with respect to name, author, date, size, media type, dimensions, duration, color metrics, media quality metrics, timing-priority metrics, and permissions of a visual media item. As described below, the digital-content-transition system can utilize media-item data of visual media items to determine content-transition types and/or content-transition times with respect to transitioning between visual media items displayed at a digital-content-display device.

Multiple visual media items can be grouped to form a visual media collection. As used herein, the term "visual media collection" refers to a set or sequence of visual media items associated with each other. For instance, a visual media collection can include a list of visual media items to be presented together. For example, a visual media collection can include a visual media sequence or a visual media playlist of visual media items. Often, a digital file for a visual media collection can indicate a display order for its included visual media items. However, in some implementations, a visual media collection can be displayed in a random order (e.g., shuffled). Also, a visual media collection can be scheduled to display for a duration of time at a digital-content-display device. If the visual media collection finishes displaying before the duration of time ends, the visual media collection can loop or repeat. Further, a digital file or set of files for a visual media collection can include media-collection data, which can include but is not limited to, information with respect to name, author, date, size, media type, dimensions, duration, color metrics, media quality metrics, timing-priority metrics, and permissions of a visual media collection.

As mentioned above, a digital-content-display device can display a visual media item at a scheduled time. As used herein, the term "scheduled time" refers to a pre-determined time associated with displaying a visual media item at a digital-content-display device. In particular, scheduled time can refer to a time of date (e.g., hh:mm:ss) when a particular visual media item and/or visual media collection is to start displaying, such as an initially scheduled time. In some implementations, a scheduled time can refer to a duration of time (e.g., 6:00 am-10:30 am) of when a visual media item and/or a visual media collection is to be displayed.

In addition, a scheduled time can be part of a visual media schedule (e.g., program schedule) that indicates when visual media items and/or visual media collections are to be displayed at a digital-content-display device with respect to one another over a duration of time (e.g., a daily, weekly, or monthly schedule). Indeed, a visual media schedule can indicate times when one visual media item and/or visual media collection is to switch or transition to another visual media item and/or visual media collection. Further, a visual media schedule can include scheduling data indicating the starting and/or stopping times of visual media items and/or visual media collections with respect to displaying at a digital-content-display device.

The term "content-transition type," as used herein, refers to a mode of converting the display at the digital-content-display device from one visual media item (or visual media collection) to another visual media item (or visual media collection). In particular, a content-transition type can comprise a particular mode or style with respect to how and when a visual media item transitions or converts to another visual media item at a digital-content-display device. Examples of content-transition types include, but are not limited to, an instantaneous content transition, a delayed content transition, an interactive content transition, and a graphical effect transition. The digital-content-transition system can determine a content-transition type from a set of content-transition types based on one or more factors, such as content transition rules, media-item data, media-collection data, time of day, user preferences, and user interactions.

As used herein, the term "content-transition time" refers to a time at which a digital-content-display devices transitions from displaying a visual media item and/or visual media collection to another visual media item and/or visual media collection. In particular, the content-transition time can replace an initially scheduled time to indicate an updated or adjusted time of when to display a new visual media item and/or new visual media collection at the digital-content-display device. For example, in many implementations, the content-transition time is after the initially scheduled time (e.g., a delayed content-transition time). In alternative implementations, the content-transition time can confirm, verify, or match the initially scheduled time (e.g., an instantaneous content-transition time). As mentioned above, the digital-content-transition system can determine a content-transition time based on the content-transition type being utilized for the content transition at the digital-content-display device 102.

As used herein, the term "converting" refers to transitioning, replacing, transforming, exchanging, switching, swapping, and/or changing a digital-content-display device from displaying a visual media item or visual media collection to displaying a different visual media item or visual media collection. In particular, the term converting can include transitioning the display at the digital-content-display device from a first visual media item to a second visual media item based on a content-transition type and at a determined content-transition time.

Referring now to the figures, FIG. 1 illustrates a schematic diagram of a system environment 100 in which a digital-content-transition system can operate in accordance with one or more implementations. As shown in FIG. 1, the environment 100 includes a digital-content-display device 102 and a client device 110 connected via a network 116. In additional implementations, the environment 100 optionally includes a server device 112 connected to the digital-content-display device 102 either directly or via the network 116. Additional detail regarding computing devices and networks is provided below in connection with FIG. 11.

Although FIG. 1 illustrates a particular number, type, and arrangement of components within the environment 100, various additional environment configurations are possible. For example, the environment 100 can include any number of client devices. As another example, the digital-content-display device 102 can represent a set of connected computing devices (e.g., having multiple digital displays). As a further example, the digital-content-display device 102 may communicate directly with the server device 112, bypassing the network 116 or utilizing a separate and/or an additional network.

As shown in FIG. 1, in one or more implementations, the digital-content-display device 102 includes a digital-content-management system 104 and a digital-content-transition system 106. In addition, the digital-content-display device 102 can include a digital display 108. While not shown, the digital-content-display device 102 can include multiple digital displays. Further, in some instances, the one or more digital displays can be located separate or apart from the digital-content-transition system 106 and/or the digital-content-display device 102.

In various implementations, the digital-content-management system 104 implements the digital-content-transition system 106. In alternative implementations, the digital-content-transition system 106 is separate from the digital-content-management system 104. For example, while the digital-content-management system 104 and the digital-content-transition system 106 are shown at the digital-content-display device 102, in some implementations, one or both of the digital-content-management system 104 and the digital-content-transition system 106 are located remotely from the digital-content-display device 102 (e.g., on the server device 112), as further described below.

The digital-content-management system 104, in general, facilitates the creation, modification, deletion, and/or sharing of digital content, including visual media items. For instance, in some cases, the digital-content-management system 104 provides a variety of tools related to digital content creation and editing of digital content. Moreover, the digital-content-management system 104 can operate in connection with one or more applications to generate, modify, and share digital content. For example, in one or more implementations, the digital-content-management system 104 operates in connection with digital design applications or other digital content creation applications.

As further indicated by FIG. 1, the digital-content-transition system 106 determines content transitions and dynamic content-transition times for converting between visual media items at a digital-content-display device. The digital-content-transition system 106 can implement one or more content-transition types from multiple content-transition types for transitioning between visual media items and/or visual media collections at the digital-content-display device 102.

As also mentioned above, the environment 100 can optionally include the server device 112. As illustrated, the server device 112 can include a digital-content-transition server system 114. In one or more implementations, the digital-content-transition server system 114 represents and/or provides similar functions as described herein with respect to the digital-content-transition system 106. In some implementations, the digital-content-transition server system 114 supports the digital-content-transition system 106 at the digital-content-display device 102. In alternative implementations, the digital-content-transition server system 114 includes the digital-content-transition system 106 and provides visual media (e.g., visual media items and/or visual media collections) to the digital display 108 at the digital-content-display device 102. Indeed, in one or more implementations, the server device 112 can include all, or a portion of, the digital-content-transition system 106.

As further indicated by FIG. 1, in various implementations, the client device 110 is associated with a user (e.g., a user client device), such as an administrative user of the digital-content-display device 102. For example, the client device 110 can include one or more client applications that enable a user to provide commands, controls, rules, and preferences to the digital-content-transition system 106. In some implementations, the client device 110 can enable a user to provide visual media to the digital-content-display device 102 for display on the digital display 108. In particular, the client device 110 can download an application from the digital-content-display device 102 and/or server device 112 or a portion of a software application.

For example, in some cases, the client device 110 downloads or accesses a client application associated with the digital-content-transition system 106. Based on user input with the client application, the client device 110 can send visual media to the digital-content-transition system 106 to be displayed on the digital display 108. Further, the client device 110 can provide controls, preferences, scheduling commands, and scheduling data to the digital-content-transition system 106 based on user input received at the client device 110.

In some implementations, the digital-content-transition system 106 can include a web hosting application that allows the client device 110 to interact with digital content and services hosted at the digital-content-display device 102 and/or the server device 112. To illustrate, in one or more implementations, the client device 110 accesses a control page supported by the digital-content-transition system 106, which facilitates creating, selecting, and scheduling visual media to be displayed at the digital-content-display device 102.

In various implementations, the digital-content-display device 102 facilitates direct user interaction. For example, the digital-content-display device 102 enables a user (e.g., an administrative user) to input or select controls, preferences, scheduling commands, and scheduling data with respect to displaying visual media at the digital-content-display device 102. Indeed, the digital-content-display device 102 may provide direct access for user input in addition to, or in place of, user input received from the client device 110.

Figure 2:
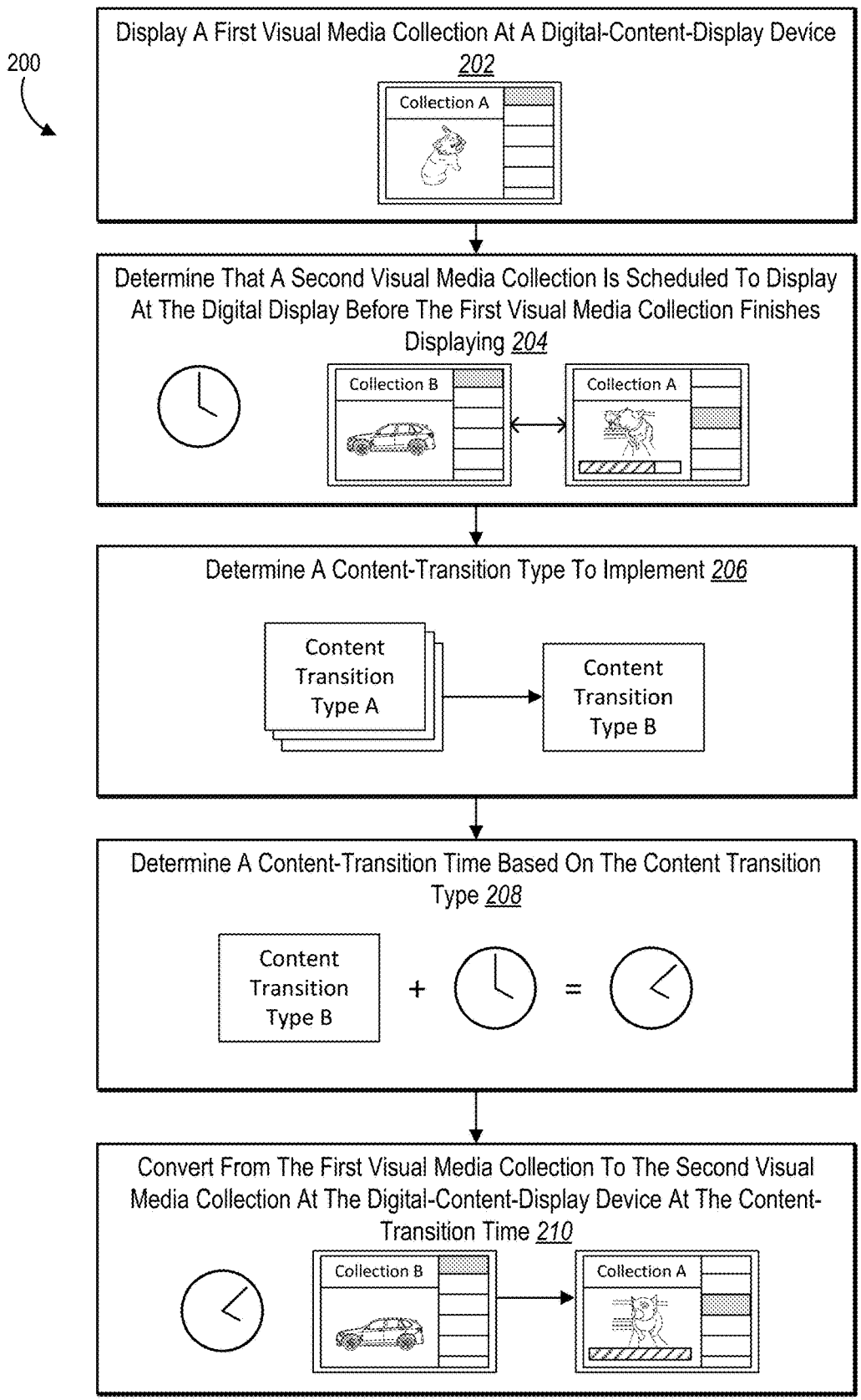
FIG. 2 illustrates a schematic diagram of dynamically transitioning between visual media collections at a digital-content-display device in accordance with one or more implementations.

Turning to the next figure, FIG. 2 provides an overview of dynamically transitioning between visual media collections at a digital-content-display device. In particular, FIG. 2 illustrates a series of acts 200 of determining a content-transition type and a content-transition time for converting a first visual media collection into a second visual media collection at a digital-content-display device in accordance with one or more implementations. Similarly, the series of acts 200 can equally apply to converting a first visual media item into a second visual media item at a digital-content-display device. In various implementations, the digital-content-transition system 106 and/or the digital-content-display device 102 implements the series of acts 200.

As shown in FIG. 2, the series of acts 200 includes an act 202 of displaying a first visual media collection (e.g., "Collection A") at the digital-content-display device 102. For example, the digital-content-transition system 106 provides the first visual media collection (e.g., a first visual media sequence or playlist) to the digital-content-display device 102 at a scheduled time and the digital-content-display device 102 displays the first visual media collection. In response, the digital-content-display device 102 displays visual media items within the first visual media collection on one or more digital displays upon receiving the first visual media collection.

As further shown, the series of acts 200 includes an act 204 of determining that a second visual media collection (e.g., "Collection B") is scheduled to display at the digital display before the first visual media collection finishes displaying. For example, in one or more implementations, the digital-content-transition system 106 at the digital-content-display device 102 receives scheduling data indicating a scheduled display of the second visual media collection at a given time (e.g., initially scheduled time). However, the digital-content-transition system 106 determines that the first visual media collection (e.g., a visual media item within the first visual media collection) will still be playing at the given time. By way of example, in some cases, the first visual media collection is 120 seconds long and is programmed to start at 1:00 p.m. If the initially scheduled time to display the second visual media collection is at 1:01 p.m., then the digital-content-transition system 106 can determine that displaying the second visual media collection at the given time will cut off half of the first visual media collection. Additional detail regarding determining that displaying a new visual media collection (or visual media item) at the digital-content-display device 102 will interrupt the display of a current visual media collection (or visual media item) is provided below with respect to FIGS. 3A-3B.

As shown in FIG. 2, the series of acts 200 includes an act 206 of determining a content-transition type to implement. For example, in one or more implementations, the digital-content-transition system 106 dynamically determines a content-transition type to utilize for converting the first visual media collection to the second visual media collection at the digital-content-display device 102. Examples of content-transition types include an instantaneous content transition, a delayed content transition, an interactive content transition, and a graphical effect transition.

In some implementations, the digital-content-transition system 106 determines the content-transition type based on media-item data associated with the first visual media collection and/or the second visual media collection. For example, the digital-content-transition system 106 compares timing-priority values or metrics of the first visual media collection and the second visual media collection. Additional detail regarding determining content-transition types is provided below with respect to FIGS. 3 and 4.

As further shown in FIG. 2, the series of acts includes an act 208 of determining a content-transition time based on the content-transition type. For example, in various implementations, the digital-content-transition system 106 determines a content-transition time based in part on the particular content-transition type selected. In particular, the digital-content-transition system 106 can generate a new or modified scheduled transition time based on the initially scheduled time (e.g., the given time) and the selected content-transition type.

In some implementations, the digital-content-transition system 106 determines a delayed content-transition time where the content-transition time is after the initially scheduled time. In these implementations, the amount of delay can be based on the content-transition type selected. In alternative implementations, the digital-content-transition system 106 determines an instantaneous content-transition time where the content-transition time matches or is close to the initially scheduled time. Additional detail regarding selecting a content-transition time is provided below with respect to FIGS. 5A-8B.

As further shown in FIG. 2, the series of acts includes an act 210 of converting from the first visual media collection to the second visual media collection in accordance with the content-transition type at the digital-content-display device 102 at the content-transition time. For example, in one or more implementations, the digital-content-transition system 106 adjusts or replaces the initially scheduled time with the dynamically determined content-transition time. Then, at the content-transition time, the digital-content-transition system 106 converts the display of the first visual media collection to the second visual media collection at the digital display of the digital-content-display device 102 utilizing the determined content-transition type. Additional detail regarding converting visual media at the digital display of the digital-content-display device 102 is provided below with respect to FIGS. 5A-8B.

Figure 3B:
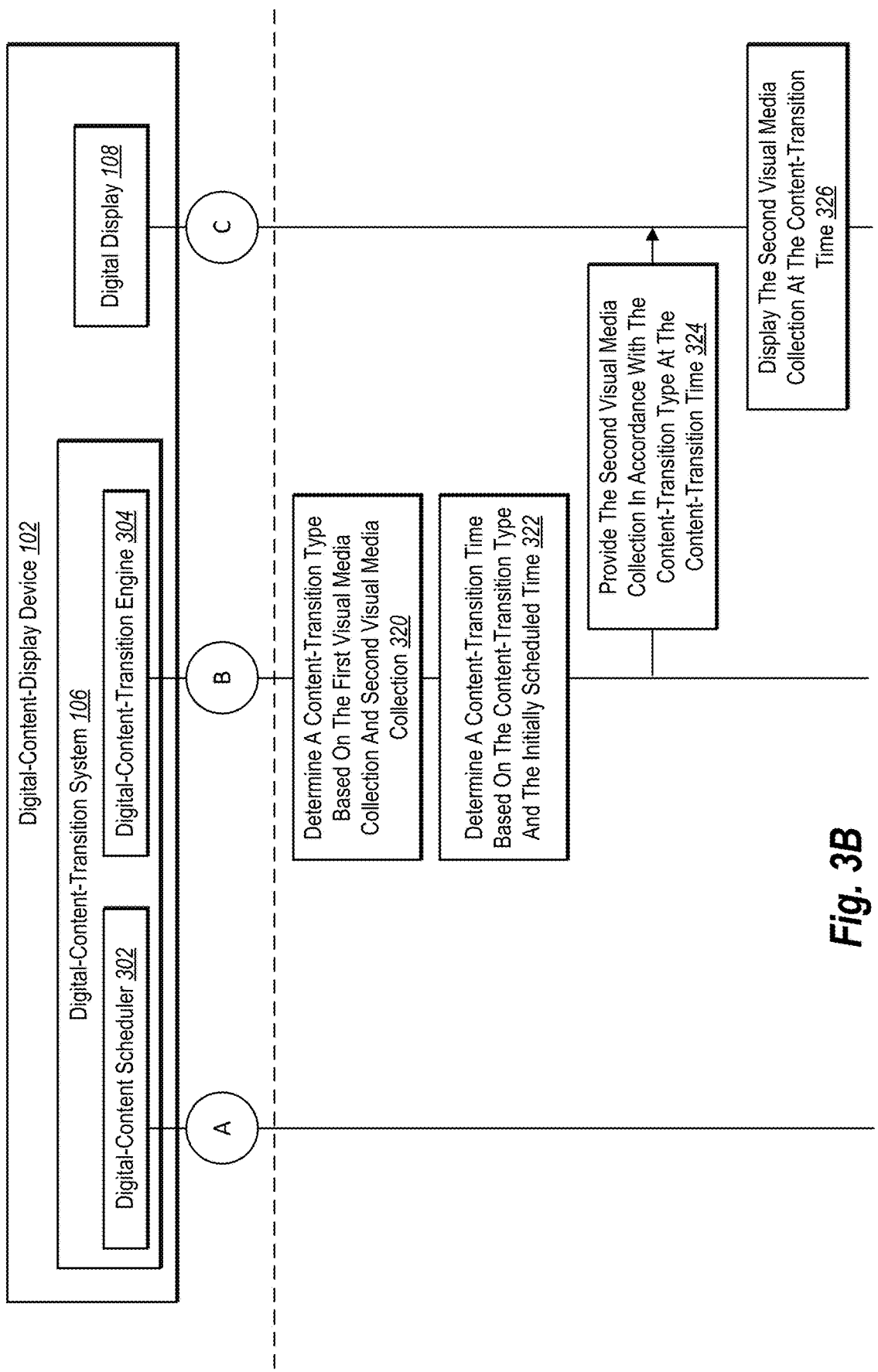

Turning to the next figures, FIGS. 3A-3B illustrate a sequence diagram of the digital-content-transition system 106 operating at the digital-content-display device 102 to dynamically convert a display from a first visual media collection to a second visual media collection. In particular, FIGS. 3A-3B illustrate a series of acts 300 of determining a content-transition type and a corresponding content-transition time for transitioning from a first visual media collection to a second visual media collection in accordance with one or more implementations.

As illustrated in FIGS. 3A-3B, the digital-content-display device 102 and portions thereof implement the series of acts 300. For example, the digital-content-display device 102 includes the digital-content-transition system 106 and a digital display 108. Further, the digital-content-transition system 106 includes a digital-content scheduler 302 and a digital-content-transition engine 304. In some implementations, the digital display 108 is located separately from the digital-content-display device 102. While FIGS. 3A-3B illustrates actions of a digital-content-display device 102 with respect to a first visual media collection and a second visual media collection, the series of acts 300 could equally correspond to a first visual media item and a second visual media item.

As shown in FIG. 3A, the series of acts 300 includes an act 310 of the digital-content scheduler 302 providing, to the digital-content-transition engine 304, scheduling data with respect to displaying a first visual media collection at the digital display 108. In some implementations, the scheduling data includes a timer event that specifies when the first visual media collection (or a first visual media item) is to be displayed on the digital display 108. For example, the scheduling data can include a starting time (e.g., an initial time) and/or a stopping time for displaying the first visual media collection (e.g., a first visual media sequence or playlist) at the digital-content-display device 102. In additional implementations, the scheduling data can indicate additional information (e.g., metadata) with respect to the visual media items within the first visual media collection, such as a media type (e.g., video, image, audio), a timing-priority value, and/or a duration as well as a sequence order for the first visual media collection.

As shown, the series of acts 300 includes an act 312 of the digital-content-transition engine 304 providing the first visual media collection to the digital display 108 according to the scheduling data. For example, the digital-content-transition engine 304 can provide the first visual media collection (or a first visual media item with the first visual media collection) at an initial or start time indicated by the scheduling data.

In one or more implementations, the digital-content-transition engine 304 accesses the first visual media collection from the digital-content-display device 102. For example, the first visual media collection (or one or more visual media items listed in the first visual media collection) is stored in memory or in a database within the digital-content-display device 102. In some implementations, the digital-content-transition engine 304 accesses the first visual media collection from a remote storage device, such as a client device, a server, or a cloud storage device. In various implementations, the digital-content-transition engine 304 provides a link to the first visual media collection and the digital display 108 directly accesses the first visual media collection (e.g., locally from the digital-content-display device 102 or remotely from another computing device).

As shown, the series of acts 300 includes an act 314 of the digital display 108 displaying and loop the first visual media collection at the digital-content-display device 102. For example, in one or more implementations, upon receiving the first visual media collection, the digital display 108 displays the first visual media collection (or a first visual media item of the visual media collection). Based on the digital-content-transition engine 304 providing the first visual media collection at the scheduled start time, the digital display 108 can instantaneously display the first visual media collection (or a visual media item within the first visual media collection) at the digital-content-display device 102 as well as loop the visual media collection after all visual media items within the first visual media collection have played. In alternative implementations, the digital-content-transition engine 304 can provide the first visual media collection to the digital display 108 before the indicated scheduled start time with instructions for the digital display 108 to play (and loop) the first visual media collection at the scheduled start time.

As shown, the series of acts 300 includes an act 316 of the digital-content scheduler 302 providing scheduling data with respect to a second visual media collection to be displayed at an initially scheduled time. For example, similar to providing scheduling data for the first visual media collection, the digital-content scheduler 302 can provide scheduling data (e.g., a timer event) to the digital-content-transition engine 304 with respect to the second visual media collection (or the second visual media item).

In various implementations, rather than providing scheduling data piecemeal with respect to each visual media collection, the digital-content scheduler 302 can provide a program schedule to the digital-content-transition engine 304 that provides scheduling data for multiple visual media collections. For example, the digital-content scheduler 302 provides a hourly, weekly, or monthly program schedule that includes scheduling data for each visual media collection (or visual media items) to be displayed within the corresponding time period.

As shown, the series of acts 300 includes an act 318 of the digital-content-transition engine 304 determining that the first visual media collection will still be displaying at the initially scheduled time. As mentioned above, the digital-content-transition engine 304 can utilize the scheduling data of the second visual media collection to determine that the second visual media collection is to start displaying at the initially scheduled time. In addition, the digital-content-transition engine 304 can determine when the first visual media collection is to finish displaying (e.g., a completion time) at the digital display 108. Based on comparing the initially scheduled time for the second visual media collection to the completion time of the first visual media collection, the digital-content-transition engine 304 can determine that the first visual media collection will still be displaying at the initially scheduled time. Additionally, or in the alternative, the digital-content-transition engine 304 can determine that one of the visual media items within the first visual media collection will still be displaying at the initially scheduled time.

In one or more implementations, the digital-content-transition engine 304 determines the completion time for the first visual media collection (or at least one of the visual media items within the first visual media collection) by communicating with the digital display 108 (e.g., an indicated by the double-arrow dashed-line in FIG. 3A). For example, the digital display 108 can provide the digital-content-transition engine 304 with indicators each time the first visual media collection (or a visual media item within the first visual media collection) starts and/or finishes playing. For instance, the digital-content-transition engine 304 can receive a start indicator each time the first visual media collection restarts. In some instances, the start indicator includes the start time, the duration of the first visual media collection, and/or when the first visual media collection is projected to finish displaying. In some implementations, the digital-content-transition engine 304 receives a completion indicator when the first visual media collection finishes. In these implementations, the digital-content-transition engine 304 can compare the scheduling data from the second visual media collection to a completion indicator for the first visual media collection to determine that the first visual media collection will still be displaying at the initially scheduled time.

In various implementations, the digital-content-transition engine 304 can send requests to the digital display 108 to determine the current status of the first visual media collection. For example, the digital-content-transition engine 304 requests the last start time of the visual media collection or a projected completion time. In some implementations, the digital-content-transition engine 304 requests that the digital display 108 provide a completion indicator when the first visual media collection finishes and/or a predetermined time before the first visual media collection (or a visual media item within the first visual media collection) finishes (e.g., 1, 5, 10, or 30 seconds before the first visual media collection finishes).

In the case of monitoring a first visual media item to finish playing, when the first visual media item is included in a visual media collection (e.g., the first visual media collection), the digital-content-transition engine 304 can determine at what time the first visual media collection will finished displaying. For example, not only can the digital-content-transition engine 304 determine that the first visual media item will still be displaying at the initially scheduled time when the second visual media collection is to be displayed, the digital-content-transition engine 304 can also determine that one or more additional visual media items in the first visual media collection will not be displayed if the digital display 108 transitions to displaying the second visual media collection at the initially scheduled time. In these implementations, the digital-content-transition engine 304 can communicate with the digital display 108, in a similar manner as described above, to determine when the first visual media item will finish displaying and/or when the first visual media collection will finish displaying.

As mentioned above, the digital-content-transition engine 304 can communicate with the digital display 108 to determine when the first visual media collection (or a visual media item within the first visual media collection) will finish displaying. In alternative implementations, the digital-content-transition engine 304 maintains a record or schedule of when the first visual media collection will finish displaying. For example, the digital-content-transition engine 304 provides the digital display 108 with the first visual media collection or a command to repeat the first visual media collection each time the first visual media collection finishes displaying (during the time scheduled to play the first visual media collection). In these instances, the digital-content-transition engine 304 knows the next completion time for the first visual media collection.

As shown in FIG. 3B, the series of acts 300 includes an act 320 of the digital-content-transition engine 304 determining a content-transition type based on the first visual media collection and the second visual media collection (or visual media items within the first visual media collection and the second visual media collection). As mentioned above, content-transition types can include instantaneous content transitions, delayed content transitions, interactive content transitions, or graphical effect transitions.

In various implementations, the act 320 includes the digital-content-transition engine 304 comparing media-collection metadata of the first visual media collection with media-collection metadata (e.g., timing-sensitivity metric) of the second visual media collection to determine a content-transition type from a set of content-transition types. In addition, the digital-content-transition engine 304 can determine a content-transition type based on additional factors, such as the media types of the first visual media collection and the second visual media collection, content-transition rules, and/or the duration of the first visual media collection from the initially scheduled time for displaying the second visual media collection to the completion of the first visual media collection (or first visual media collection or playlist).

As shown, the series of acts 300 includes an act 322 of the digital-content-transition engine 304 determining a content-transition time based on the content-transition type and the initially scheduled time. For instance, the digital-contenttransition engine 304 determines a content-transition time that indicates when to provide the second visual media collection to the digital display 108. For example, in some cases, the content-transition time indicates providing the second visual media collection at the initially scheduled time or at a later time.

In addition, as shown in FIG. 3B, the series of acts 300 includes an act 324 of the digital-content-transition engine 304 providing the second visual media collection in accordance with the content-transition type at the content-transition time. As mentioned above, the digital-content-transition engine 304 can provide the second visual media collection to the digital display 108 or enable the digital display 108 to access the second visual media collection. In addition, the digital-content-transition engine 304 can provide the second visual media collection for display at the content-transition time or provide the second visual media collection before the content-transition time with instructions to play the second visual media collection at the content-transition time.

Further, in some implementations, the digital-content-transition engine 304 can provide the second visual media collection in accordance with the selected content-transition type. For example, if the selected content-transition type indicates a given graphical effect as part of the transition, the digital-content-transition engine 304 can provide the graphical effect to the digital display 108 (or instruct the digital display 108 to access and/or execute the graphical effect).

As shown, the series of acts 300 includes an act 326 of the digital display 108 displaying the second visual media collection at the content-transition time. For example, the digital display 108 converts the display of the first visual media collection (or first visual media item) to the display of the second visual media collection at the content-transition time. If the digital-content-transition engine 304 provides or indicates a graphical effect, the digital display 108 can display the graphical effect in connection with converting the display from the first visual media collection to the second visual media collection. As mentioned above, based on when the digital-content-transition engine 304 determines the content-transition time, the digital display 108 may convert to the second visual media collection at or after the initially scheduled time.

Figure 4:
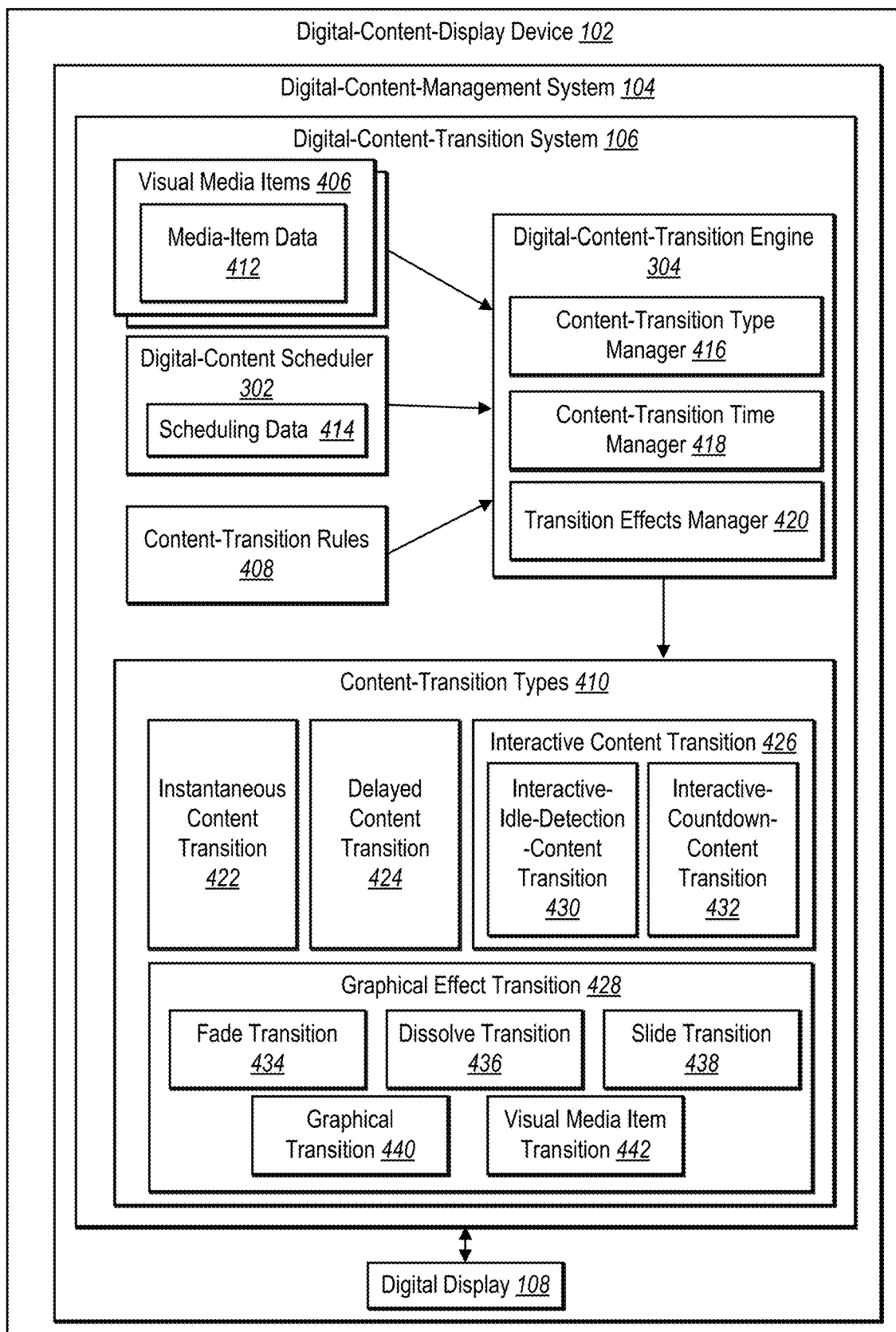
FIG. 4 illustrates a schematic diagram of a digital-content-display device for determining a content-transition type from a set of content-transition types in accordance with one or more implementations.

Turning to FIG. 4, additional detail is provided with respect to determining content-transition types. In particular, FIG. 4 illustrates a schematic diagram of a digital-content-display device determining a content-transition type from a set of content-transition types in accordance with one or more implementations. As shown, FIG. 4 includes an implementation of the digital-content-display device 102 connected to the digital display 108.

As illustrated in FIG. 4, the digital-content-display device 102 includes the digital-content-management system 104 and the digital-content-transition system 106 introduced above. In particular, as shown in FIG. 4, the digital-content-transition system 106 includes the digital-content scheduler 302 and the digital-content-transition engine 304, as described above, as well as visual media items 406, content-transition rules 408, and content-transition types 410.

The visual media items 406, as shown, include media-item metadata 412 for each of the visual media items 406. As noted above, the media-item metadata 412 can include information with respect to the name, author, date, size, media type, dimensions, duration, color metrics, media quality metrics, timing-priority metrics, and permissions of a visual media item. For example, the media-item metadata 412 for a given visual media item indicate an high-definition video with a duration of 23 seconds and a medium timing-priority value. In addition, the media-item metadata 412 can include whether a visual media item is an advertisement, advertisement statistics, and conditions/requirements for serving the advertisements.

In some implementations, the visual media items 406 can include information with respect to visual media collections. As described above, a visual media collection can include a collection, list, or group of visual media items. Accordingly, the visual media items 406 may include information connecting or grouping multiple visual media items in a visual media collection. Additionally, the visual media items 406 can include media-collection metadata with respect to a visual media collection. For example, media-collection metadata can indicate which visual media items are included and the order of the visual media items in the visual media collection.

The digital-content scheduler 302, as shown, includes scheduling data 414. For example, as described above, the scheduling data 414 can include timing information for multiple visual media items. As one example, the scheduling data 414 can indicate when a visual media item (or visual media collection) is to be displayed and for how long. As another example, the scheduling data 414 can include timer events that are triggered when the next visual media item (and/or visual media collection) is to be displayed at the digital-content-display device 102. In some implementations, the scheduling data 414 includes programming information for each visual media item that is to be displayed within a time period (e.g., a daily, weekly, or monthly schedule).

As mentioned above, the digital-content-transition system 106 includes the content-transition rules 408. In various implementations, the content-transition rules 408 provide guidelines, directions, and/or procedures for determining a content-transition type based on one or more factors. For example, the content-transition rules 408 can indicate which content-transition types to select when one or more conditions associated with the first visual media item or the second visual media item are satisfied. In some implementations, the content-transition rules 408 can be organized in a hierarchy structure that indicates priority among the content-transition rules 408. Further examples of content-transition rules 408 are provided below with respect to determining a content-transition type from the set content-transition types 410.

In one or more implementations, content-transition rules 408 are generated and/or updated automatically. For example, the digital-content-transition system 106 may create a content-transition rule utilizing a machine-learning model trained to generate new content-transition rules based on observing changes to existing rules. In some implementations, content-transition rules 408 are generated and/or updated based on user input. For example, the digital-content-transition system 106 receives user input (e.g., from an administrative user) that creates, defines, modifies, edits, and/or implements one or more content-transition rules 408. Additionally, the digital-content-transition system 106 can receive user input to associate a particular rule to a target visual media item.

As further shown in FIG. 4, the digital-content-transition engine 304 includes a content-transition type manager 416, a content-transition time manager 418, and a transitions effects manager 420. In general, the digital-content-transition engine 304 determines the content-transition type, the content-transition time, and whether to apply a graphical effect to a content transition between a first visual media item and a second visual media item, as described above.

Before further describing components of the digital-content-transition engine 304, an introduction of the content-transition types 410 is first provided. As shown, the content-transition types 410 (or set of content-transition types 410) includes an instantaneous content transition 422, a delayed content transition 424, an interactive content transition 426, and a graphical effect transition 428. The interactive content transition 426 can include an interactive-idle-detection-content transition 430 and an interactive-countdown-content transition 432. Additionally, the graphical effect transition can include various graphical effects, including, but not limited to, a fade transition 434, a dissolve transition 436, a slide transition 438, a graphical transition 440, and a visual-media-item transition 442. Additional details with respect to each content-transition type are provided below in connection with the disclosure of the content-transition type manager 416 within the digital-content-transition engine 304.

Notably, the following description supposes that the second visual media item being scheduled to display before the first visual media item finishes displaying. Indeed, for ease of explanation, the following description builds upon the concepts introduced above in FIGS. 3A-3B with respect to the acts 310-326 of the series of act 300. However, in some embodiments, the digital-content-transition engine 304 can also determine a content-transition type, a corresponding content-transition time, and a graphical effect to execute at the digital-content-display device 102 when no display conflict exists (e.g., the second visual media item is scheduled to display when the first visual media item as finished displaying), To illustrate, in one or more implementations, the content-transition type manager 416 determines a content-transition type from the set of content-transition types 410 for transitioning between the first visual media item and the second visual media item based on determining that the second visual media item is scheduled to display before the first visual media item finishes displaying. As further described below, the content-transition type manager 416 can determine a content-transition type from the set of content-transition types 410 based on the media-item metadata 412 from the visual media items 406 (e.g., the first visual media item and the second visual media item), scheduling data 414 from the digital-content scheduler 302, and the content-transition rules 408.

In one or more implementations, the content-transition type manager 416 receives a first set of media-item metadata for the first visual media item and a second set of media-item metadata for the second visual media item. In these implementations, the content-transition type manager 416 can compare one or more metrics from the sets of media-item metadata, with respect to one or more content-transition rules 408, to determine a content-transition type. Indeed, the content-transition type manager 416 can apply a set of heuristics provided by the content-transition rules 408 to one or more metrics from the media-item metadata to determine which content-transition type to select from the set of content-transition types 410.

To demonstrate, in various implementations, based on comparing a timing-priority value from the media-item metadata of the first visual media item to a timing-priority value from the media-item metadata of the second visual media item, the content-transition type manager 416 can determine whether to select the instantaneous content transition 422 or the delayed content transition 424 as the content-transition type. As mentioned above, the instantaneous content transition 422 can indicate displaying the second visual media item at the initially scheduled time regardless of whether the first visual media item has finished playing. The delayed content transition 424 can indicate waiting for the first visual media item (or a first visual media collection in which the first visual media item is included) has finished displaying until displaying the second visual media item. In some implementations, the instantaneous content transition 422 can indicate displaying the second visual media item after the initially scheduled time but before the first visual media item finishes displaying.

As an example of selecting a content-transition type, the content-transition type manager 416 selects the instantaneous content transition 422 when the timing-priority value of the second visual media item is greater (e.g., more time-sensitive) than the timing-priority value of the first visual media item. Indeed, the timing-priority value of the second visual media item may indicate to the content-transition type manager 416 that the second visual media item needs to start immediately at the initially scheduled time (or at least start before the first visual media item finished displaying). For instance, the second visual media item is a countdown to the start of an event (e.g., the New Year) or an announcement (e.g., a draft pick).

As another example, the content-transition type manager 416 selects the delayed content transition 424 when the timing-priority value of the first visual media item is greater than and/or equal to the timing-priority value of the second visual media item. Here, the first visual media item and the second visual media item can have the same timing-priority value. Accordingly, based on one or more content-transition rules 408, the content-transition type manager 416 determines to delay displaying the second visual media item until the first visual media item is finished displaying.

Indeed, the content-transition type manager 416 identifies and applies a content-transition rule that indicates selection of the delayed content transition when the timing-priority values between the first and second visual media item are equal or when the first visual media item has a greater timing-sensitivity value than the second visual media item (e.g., the first visual media item an advertisement with a high timing-priority value indicated that the advertisement should not be cut off). In alternative implementations, when the timing-priority value of the first visual media item is equal to the timing-priority value of the second visual media item, the content-transition type manager 416 can determine to select the instantaneous content transition 422 as the content-transition type.

As mentioned above, the delayed content transition 424 can include multiple variations. For example, as one variation, the delayed content transition 424 can include delaying the display of the second visual media item until the first visual media item concludes displaying. As another variation, the delayed content transition 424 can include further delaying the display of a second visual media collection until the first visual media collection finishes displaying. Whether the delayed content transition 424 indicates waiting for the first visual media item or the first visual media collection (or at least an additional visual media item within the visual media collection) to conclude can depend on one or more of the content-transition rules 408.

To illustrate, in one or more instances, the content-transition type manager 416 identifies a content-transition rule that indicates whether to delay displaying the second visual media item until after the first visual media collection finishes based on the number of visual media items yet to play in the visual media collection after the initially scheduled time. For example, the delayed content transition 424 corresponds to delay until the end of the visual media collection if less than five visual media items remain, otherwise, delay until after the first visual media item finishes.

In another instance, the content-transition type manager 416 identifies a content-transition rule that indicates whether to delay displaying the second visual media item until after the first visual media collection finishes based on the amount of time remaining for the first visual media item and/or the first visual media collection. For example, the delayed content transition 424 corresponds to delaying until after the visual media item displays if the remaining time for the first visual media item is above a first threshold and/or delaying until after the visual media collection finishes displaying if the remaining time for the first visual media collection is less than a second threshold.

In some instances, the content-transition type manager 416 can determine that one or more visual media items following the first visual media item in the first visual media collection are closely tied to the first visual media item. Here, the content-transition type manager 416 can correspond to delaying until after the related visual media items play based on their connection to the first visual media item. In other instances, the delayed content transition 424 can correspond to enabling a number of visual media items within the first visual media collection to play until a time-out threshold is met (e.g., the delayed content transition 424 will delay displaying the second visual media item up to the last visual media item in the first visual media collection that can finish playing within five minutes).

In one or more implementations, the content-transition type manager 416 determines a content-transition type based in part on the remaining time of the first visual media item and/or the first visual media collection. For instance, the digital-content-transition system 106 can determine if the first visual media item will finish displaying within a first time threshold, a second time threshold, or a third time threshold (e.g., the short duration of time, the medium duration of time, and the long duration of time, respectively). If the first visual media item will finish displaying within the first time threshold, the content-transition type manager 416 can determine to select the delayed content transition 424. If the first visual media item will finish displaying within the second time threshold, the content-transition type manager 416 can compare other metrics (e.g., the timing-sensitivity values) to determine which content-transition type to select. Further, if the first visual media item will not finish displaying before the third time threshold, the content-transition type manager 416 can determine to select the instantaneous content transition 422 and/or the graphical effect transition 428.

In some implementations, the content-transition type manager 416 determines a content-transition type based in part on the media type of the first visual media item. For example, if the first visual media item is a video, the content-transition type manager 416 may determine to select the delayed content transition 424, as described above. However, if the first visual media item is an image, the content-transition type manager 416 may determine to select the instantaneous content transition 422 and/or the graphical effect transition 428. In some implementations, when the first visual media item is an image, the content-transition type manager 416 may ensure that the first visual media item has displayed for at least a minimum amount of time (e.g., 10, 15, or 20 seconds) before converting to the second visual media item. Accordingly, if the first visual media item has displayed for the minimum amount of time, the content-transition type manager 416 can determine to select the graphical effect transition 428 (e.g., slowly fading out the image). Otherwise, the content-transition type manager 416 selects the delayed content transition 424 and delays the content transition until the first visual media item has displayed for at least the minimum amount of time.

In some implementations, the content-transition type manager 416 determines a content-transition type based in part on a number of times that the first visual media item has displayed at the digital display 108 within a predetermined period of time. For example, if the first visual media item has repeated five times in the last ten minutes (e.g., viewing users have likely seen the full version of the first visual media item), the content-transition type manager 416 can determine to select the instantaneous content transition 422 and/or the graphical effect transition 428, which would convert the digital display 108 from the first visual media item to the second visual media item before the first visual media item finishes displaying. Otherwise, if the first visual media item has not repeated at least a minimum number of times within a predetermined time frame, the content-transition type manager 416 can determine to select delayed content transition 424 as the content-transition type to allow the first visual media item to finish displaying or display at least the minimum amount of times.

In one or more implementations, the content-transition type manager 416 can identify media-item metadata for the first visual media item that indicates that the first visual media item includes interactive content. In these implementations, the content-transition type manager 416 can determine to select the interactive content transition 426 from the set of content-transition types 410. In general, the interactive content transition 426 provides additional time (e.g., a time buffer) to viewing users interacting with the content of the first visual media item at the digital-content-display device 102 before converting the digital-content-display device 102 to the second visual media item. In this manner, the digital-content-transition system 106 prevents abruptly cutting off a viewing user experience with the first visual media item at the digital-content-display device 102, which could result in frustration, loss work, and wasted processing and real-time memory usage at the digital-content-display device 102.

In various implementations, when the content-transition type manager 416 determines to select the interactive content transition, the content-transition type manager 416 can determine whether a viewing user is actively interacting with the first visual media item at, before, or after the initially scheduled time. For example, the content-transition type manager 416 can communicate with an input device associated with the digital-content-display device 102 (e.g., a keyboard, mouse, touchscreen, etc.) to detect user input at or near the initially scheduled time. The content-transition type manager 416 can record a timestamp of the last user interaction detected at the digital-content-display device 102.

As mentioned above, the interactive content transition 426 can include the interactive-idle-detection-content transition 430 and the interactive-countdown-content transition 432. In various implementations, the interactive-idle-detection-content transition 430 includes waiting for an idle time to elapse (e.g., 0.5, 1, 5, or 10 minutes) from the last detected user interacting with the first visual media item before converting the digital display 108 from the first visual media item to the second visual media item.

Additionally, the interactive-countdown-content transition 432 can include converting the digital display 108 from the first visual media item to the second visual media item upon a countdown timer elapsing. In one or more implementations, the countdown timer is provided on the digital display 108 as an indicator or warning to the viewing user that the interactive experience is about to end. In some implementations, the viewing user can extend the timer (e.g., by selecting an option to extend). In various implementations, the countdown timer is not displayed on the digital display 108. Further, in some implementations, the countdown timer begins at the initially scheduled time. In other implementations, the countdown timer waits for user interactions to end for up to a predetermined amount of time after the initially scheduled time before commencing (e.g., the countdown timer starts at 10 minutes after the initially scheduled time if a viewing user continues to interact with the first visual media item or sooner if the viewing user finishes interacting with the first visual media item).

In one or more implementations, the content-transition type manager 416 can determine to select the graphical effect transition 428 from the set of content-transition types 410. For example, the content-transition type manager 416 identifies media-item metadata associated with the second visual media item that includes the graphical effect transition 428 to apply when converting from the first visual media item to the second visual media item at the digital-content-display device 102. In some implementations, the content-transition type manager 416 determines to add the graphical effect transition 428 to another selected content-transition type.

As mentioned above, graphical effect transitions can include multiple types of graphical effects. For example, the graphical effect transition 428 can include a fade transition 434, where converting from the visual media item to the second visual media item includes fading from the first visual media item to the second visual media item. Similarly, the graphical effect transition 428 can include a dissolve transition 436 that dissolves from the first visual media item to the second visual media item. Additionally, the graphical effect transition 428 can include the slide transition 438 that slides from the first visual media item to the second visual media item. Further, the graphical effect transition 428 can include other graphical effects (e.g., transition aminations) not listed that smoothly transition between displaying the first visual media item (or first visual media collection) and the second visual media item (or second visual media collection) such that the conversion is unabrupt to a viewing user.

As shown, the graphical effect transition 428 can include the graphical transition 440. In one or more implementations, the graphical transition 440 can include inserting a graphic, such as displaying an image or logo at the digital display 108 before displaying the second visual media item. For example, the operator of the digital-content-display device 102 can display their company logo for a period of time each time the digital-content-display device 102 switches between visual media collections.

As also shown, the graphical effect transition 428 can include the visual-media-item transition 442. In various implementations, the visual-media-item transition 442 can include displaying a visual media item (e.g., a third visual media item) before displaying the second visual media item at the time of conversion. For example, if the first visual media item is part of a first visual media collection and the second visual media item is part of a second visual media collection, then the visual-media-item transition 442 can cause the digital display 108 to display the third visual media item (e.g., an advertisement) between displaying the first visual media collection and the second visual media collection. In some implementations, the visual-media-item transition 442 includes displaying multiple visual media items (e.g., a visual media collection) before displaying the second visual media item at the digital display 108.

As mentioned above, the content-transition type manager 416 can determine a content-transition type from the set of content-transition types 410 based on the media-item metadata 412 from the visual media items 406 (e.g., the first visual media item and the second visual media item), scheduling data 414 from the digital-content scheduler 302, and the content-transition rules 408. For example, the content-transition type manager 416 can follow the content-transition rules 408 to automatically determine which content-transition type to apply to a visual media conversion.

In some implementations, the media-item metadata 412 and/or the scheduling data 414 indicate a content-transition type to utilize when converting between the first visual media item and the second visual media item. In these implementations, the indicated content-transition type can supersede one or more of the content-transition rules 408. For example, an administrative user generating a programming schedule can indicate in the scheduling data 414 which of the content-transition types 410 to utilize when transitioning from the first visual media item to the second visual media item at the digital-content-display device 102. As another example, the administrative user can tag the second visual media item with a particular content-transition type (e.g., within its media-item metadata) to indicate that a particular content-transition type should be used when before displaying the second visual media item.

In one or more implementations, the digital-content-transition system 106 provides a graphical user interface that prompts a user (e.g., an administrative user and/or a content author) to select a content-transition type to associate with a visual media item and/or visual media collection. Additionally, or in the alternative, the digital-content-transition system 106 can enable the user to select one or more of the content-transition rules 408 for the digital-content-transition system 106 to execute when determining a content-transition type (as well as the priority of the selected rules). In this manner, the digital-content-transition system 106 enables users to configure how a takeover transition will occur between visual media items.

Based on determining a content-transition type, the digital-content-transition engine 304 can determine the content-transition time. In particular, the content-transition time manager 418 at the digital-content-transition engine 304 can determine the content-transition time of when to transition the digital display 108 to the second visual media item. As mentioned above, the content-transition time indicates a new and/or updated time for the digital display 108 to start displaying the second visual media item. Indeed, the content-transition time can validate, adjust, delay, and/or replace the initially scheduled time. As described below, the content-transition time can be at or near the initially scheduled time or after the initially scheduled time.

In one or more implementations, the content-transition time manager 418 can determine the content-transition time based on the determined content-transition type and the initially scheduled time. However, displaying the second visual media item at the digital display 108 at the initially scheduled time would convert the digital display 108 from the first visual media item to the second visual media item before the first visual media item finishes displaying. Accordingly, the content-transition time manager 418 determines the content-transition time of when to begin displaying the second visual media item at the digital display 108.

As mentioned above, the content-transition time manager 418 can determine the content-transition time based on the determined content-transition type. For example, in response to determining the instantaneous content transition 422 as the content-transition type, the content-transition time manager 418 can determine an instantaneous content-transition time as the content-transition time. As mentioned above, the instantaneous content transition 422 can correspond to instantaneously converting or replacing the first visual media item with the second visual media item at the content-transition time, even if the first visual media item has not finished displaying. In some cases, the digital-content-transition system 106 determines the instantaneous content transition 422 when it is critical that the second visual media item start and/or end at a particular time (e.g., a New Year's countdown that ends precisely at midnight).

In one or more implementations, the instantaneous content-transition time is the same or near the same time as the initially scheduled time. For example, the content-transition time manager 418 uses the initially scheduled time to set the instantaneous content-transition time. Thus, in some embodiments, replacing the initially scheduled time with the instantaneous content-transition time yields no change with respect to the conversion time as these two times are the same.

With respect to determining to utilize a delayed content transition 424, in some embodiments, the content-transition time manager 418 can determine a delayed content-transition time as the content-transition time. For example, when the delayed content transition 424 is selected, the digital-content-transition system 106 waits for at least the first visual media item to finish displaying before converting the digital display 108 from the first visual media item to the second visual media item. Accordingly, the content-transition time manager 418 determines a delayed content-transition time that is after the initially scheduled time.

In one or more implementations, the content-transition time manager 418 determines the delayed content-transition time by adding the remaining time of the first visual media item to the initially scheduled time such that the delayed content-transition time matches the time that the first visual media item finishes displaying at the digital display 108. For example, the content-transition time manager 418 determines or identifies the amount of remaining time for displaying the first visual media item, which is used to adjust the initially scheduled time.

In some implementations, the content-transition time manager 418 receives indications (e.g., from the digital display 108) of when the first visual media item starts over. In some implementations, the content-transition time manager 418 can utilize the starting timestamp of the first visual media item with the duration of the first visual media item (e.g., obtained from the media-item metadata of the first visual media item) to determine the delayed content-transition time of when the first visual media item will finish displaying or playing.

In various implementations, the content-transition time manager 418 receives indications of when the first visual media item finishes displaying at the digital display 108. In these implementations, the content-transition time manager 418 determines the delayed content-transition time in real time or near-real time to be the time that the first visual media item finishes displaying. In additional implementations, the digital-content-transition system 106 can send a graphical effect transition 428, such as a graphic transition 440, to display at the digital display 108 upon the first visual media item finishing while the digital display 108 loads the second visual media item to begin playing.

Similarly, when the delayed content transition 424 corresponds to allowing a first visual media collection to finish displaying, the content-transition time manager 418 can determine the delayed content-transition time that corresponds to the first visual media collection partially or fully finishing, as described above (e.g., based on media-item metadata, media-collection metadata, and/or communication from the digital display 108). For example, the content-transition time manager 418 determines the delayed content-transition time as the time when the first visual media item and one or more related visual media items in the first visual media item finish displaying.

With respect to the interactive content transition, the content-transition time manager 418 can determine either an instantaneous or delayed content-transition time as the content-transition time. For example, when the interactive content transition is selected as the content-transition type, the content-transition time manager 418 can check for the presence of user interactions. If no interactions occur leading up to the initially scheduled time, the content-transition time manager 418 can determine to utilize the instantaneous content-transition time as the content-transition time, which enables the digital display 108 to instantaneously convert the first visual media item to the second visual media item.

In alternative implementations, when interactions are detected, the content-transition time manager 418 can determine to utilize the delayed content-transition time as the content-transition time. In this manner, the digital-content-transition system 106 prioritizes the experience of a user over abrupt scheduling. To illustrate, when the interactive-idle-detection-content transition 430 is selected as the content-transition type, the content-transition time manager 418 can set the delayed content-transition time as the time the idle timer will elapse. If the idle timer is reset due to detecting a user interaction (e.g., by a viewing user continuing to interact with the digital-content-display device 102), the content-transition time manager 418 can reset or further push back the delayed content-transition time. In some implementations, the content-transition time manager 418 establishes a time limit where the delayed content-transition time cannot be pushed beyond (e.g., 5, 10, 15, or 30 minutes).

As another example, when the interactive-countdown-content transition 432 is selected as the content-transition type, the content-transition time manager 418 can set the delayed content-transition time as the time the countdown timer elapses. In some instances, if the countdown timer is reset (e.g., due to a user requesting an extension of time), the content-transition time manager 418 can reset the delayed content-transition time.

With respect to the graphical effect transition 428, in some cases, the content-transition time manager 418 can determine either an instantaneous or a delayed content-transition time as the content-transition time. In further implementations, the content-transition time manager 418 can determine an advanced content-transition time, which occurs before the initially scheduled time, as described below.

To illustrate, in some implementations, the content-transition time manager 418 determines to utilize the instantaneous content-transition time as the content-transition time when selecting and/or applying the graphical effect transition 428. For example, when selecting the fade transition 434, the dissolve transition 436, or the slide transition 438, the content-transition time manager 418 can utilize the instantaneous content-transition time, which causes the graphical effect transition 428 to begin at the same time as the initially scheduled time. However, rather than abruptly cutting off the first visual media item and displaying the second visual media item at the digital display 108, the digital display 108 utilizes a graphical effect to smoothly transition between the visual media items being displayed.

In alternative implementations, the content-transition time manager 418 can determine an advanced content-transition time when utilizing the graphical effect transition 428. For example, because the graphical effect transition 428 is applied over the first visual media item and the second visual media item, the graphical effect transition 428 starts before the first visual media item finishes displaying and ends after the second visual media item begins displaying.

To illustrate, the content-transition time manager 418 can determine (or select) the time duration of a graphical effect transition 428 (e.g., the fade transition 434, the dissolve transition 436, or the slide transition 438), allocate a first portion of the time duration to occur before the initially scheduled time, and allocate the remainder of the time duration (i.e., a second allocated portion), if any, to occur after the initially scheduled time. Based on the first allocated portion, the content-transition time manager 418 can determine the advanced content-transition time by reducing the initially scheduled time by the first allocated portion of time. In this manner, the digital display 108 can begin applying the graphical effect transition 428 at the advanced content-transition time to the first visual media item, smoothly and gracefully convert the display from the first visual media item to the second visual media item utilizing the graphical effect transition 428, and finish applying the graphical effect transition 428 to the second visual media item at or after the initially scheduled time.

In some implementations, the content-transition time manager 418 can determine the delayed content-transition time as the content-transition time when utilizing the graphical effect transition 428. For example, if the graphical effect transition 428 is the graphical transition 440 or the visual-media-item transition 442, the content-transition time manager 418 can determine the delayed content-transition time of when to start displaying the second visual media item after the graphical transition 440 or the visual-media-item transition 442 finishes displaying. Similarly, if the graphical effect transition 428 is the fade transition 434, the dissolve transition 436, or the slide transition 438, but does not start until the initially scheduled time, the content-transition time manager 418 can determine a delayed content-transition time that allows for the graphical effect transition 428 to be applied to the first visual media item before transitioning to the second visual media item.

In additional implementations, if the graphical effect transition 428 is combined with another content-transition type, such as the delayed content transition 424, the content-transition time manager 418 can determine a delayed content-transition time that is further delayed from the initially scheduled time. For example, the content-transition time manager 418 determines the delayed content-transition time based on the amount of time remaining to display the first visual media item as well as the duration of time to display the graphical effect transition 428.

As mentioned above, the digital-content-transition engine 304 in FIG. 4 includes the transition effects manager 420. In some implementations, the transition effects manager 420 determines when to apply a graphical effect to a content transition. Indeed, as described above, the digital-content-transition system 106 can combine the graphical effect transition 428 with another type of content-transition to generate a compound content-transition type.

In various implementations, the transition effects manager 420 determines to add a graphical effect transition 428 to a content transition based on media-item metadata associated with the first visual media item and/or the second visual media item. For example, the second visual media item includes a media-item metadata attribute that specifies a particular graphical effect transition 428 to utilize when transitioning to the second visual media item.

In some implementations, the transition effects manager 420 determines to add a graphical effect transition 428 to a content transition based on scheduling data 414. For instance, the scheduling data 414 includes instructions for utilizing the graphical transition 440 (e.g., a logo) in between switching between the first visual media item and the second visual media item.

In other implementations, the transition effects manager 420 determines to add the graphical effect transition 428 to a content transition based on content-transition rules 408 that indicate using a particular graphical effect transition 428 with a particular content-transition type, unless overruled by a higher priority rule or user instructions. For example, the transition effects manager 420 can identify a content-transition rule that indicates that the instantaneous content transition 422 should also include either the fade transition 434, the dissolve transition 436, the slide transition 438, or another amination transition.

As shown in at least FIGS. 3 and 4, this disclosure depicts various implementations of dynamically transitioning between visual media items at the digital-content-display device. Accordingly, the actions and algorithms described in connection with at least these figures provide example structure and algorithms for performing a step for determining a content-transition type between the first visual media item and a second visual media item at the digital-content-display device. Indeed, the flow chart described in connection with FIGS. 3A-3B and the schematic diagram of FIG. 4 provide different examples of actions and structure for one or more of the algorithms corresponding to the digital-content-transition system 106 determining a content-transition type from a set of content-transition types.

Figure 5A:
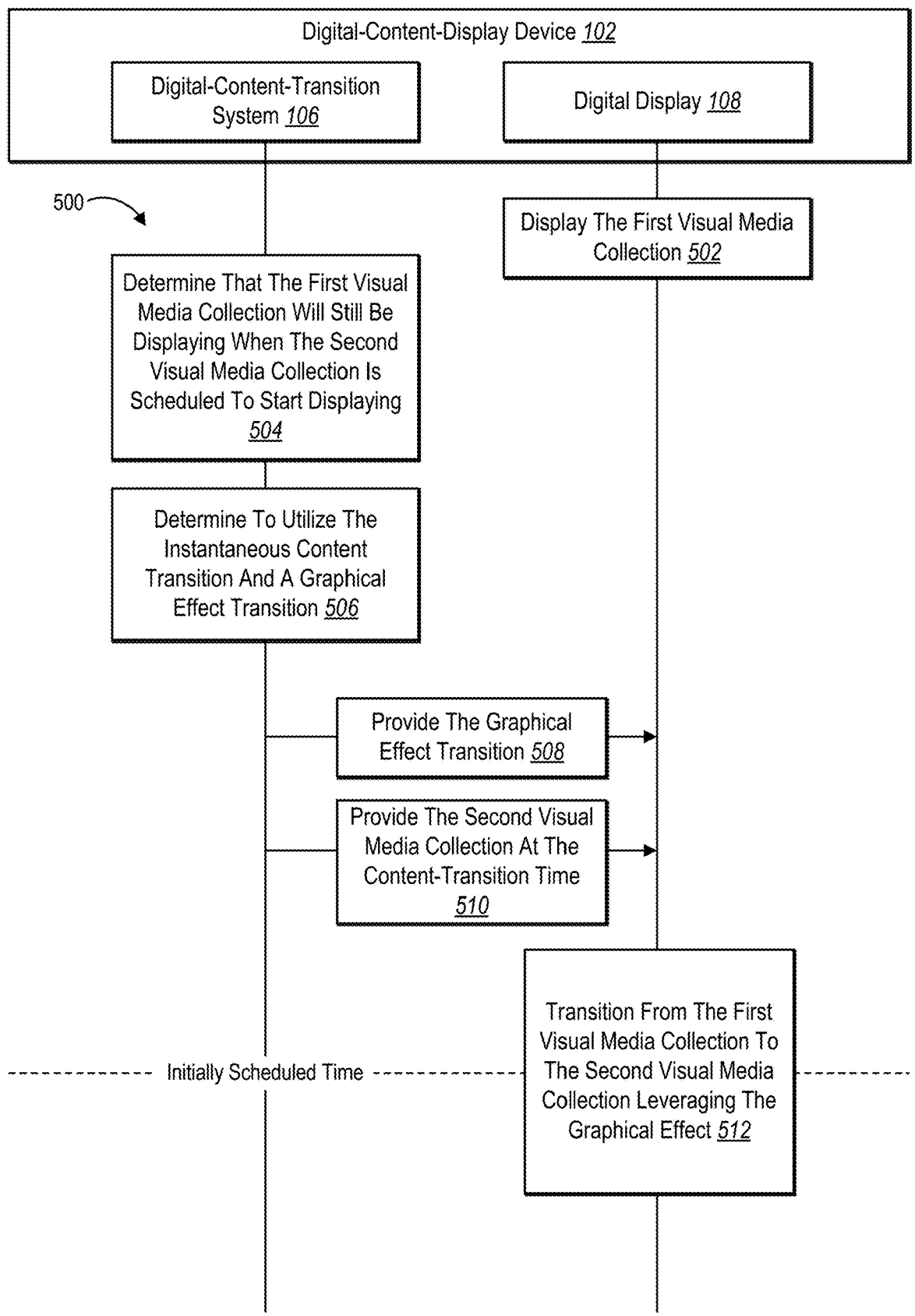
FIG. 5A illustrates a flow chart of a series of acts for utilizing an instantaneous content transition in accordance with one or more implementations.

Turning now to FIGS. 5A-8B, additional detail is provided with respect to applying each of the content-transition types. FIGS. 5A-5C correspond to instantaneous content transitions and graphical effect transitions. FIGS. 6A-6B correspond to delayed content transitions. FIGS. 7A-8B correspond to interactive content transitions.

In particular, FIG. 5A illustrates a flow chart of a series of acts 500 for utilizing an instantaneous content transition as the determined content-transition type in accordance with one or more implementations. As shown in FIG. 5A, the digital-content-display device 102 can implement the series of acts 500. More specifically, the digital-content-transition system 106 and the digital display 108, which are described above, can implement the series of acts 500.

As shown, the series of acts 500 includes an act 502 of the digital display 108 displaying the first visual media collection (or a first visual media item within the first visual media collection) and an act 504 of the digital-content-transition system 106 determining that the first visual collection will still be displaying when the second visual media collection is scheduled to start displaying (e.g., at the initially scheduled time). In one or more implementations, the act 502 can correspond to the acts 310-314 of FIG. 3A. Similarly, in one or more implementations, the act 504 corresponds to the acts 316 and 318 of FIG. 3A.

As further shown in FIG. 5A, the series of acts 500 includes an act 506 of the digital-content-transition system 106 determining to utilize the instantaneous content transition and a graphical effect transition. As described above, the digital-content-transition system 106 can utilize media-item metadata (e.g., timing-sensitivity values), scheduling data, and/or content-transition rules with respect to a first visual media item within the first visual media collection and a second visual media item within a second visual media collection to determine the instantaneous content transition as the content-transition type. For example, the digital-content-transition system 106 determines the instantaneous content transition as the content-transition type based on a first timing-priority value corresponding to the media-item metadata of the first visual media item being less than a second timing-priority value corresponding to the media-item metadata of the second visual media item. Similarly, the digital-content-transition system 106 determines the instantaneous content transition as the content-transition type based on a first timing-priority value corresponding to the media-collection metadata of the first visual media collection being less than a second timing-priority value corresponding to the media-collection metadata of the second visual media collection.

Based on determining the instantaneous content transition, the digital-content-transition system 106 can determine a content-transition time. As described above, when utilizing the instantaneous content transition, the digital-content-transition system 106 can determine an instantaneous content-transition time as the content-transition time. In some implementations, the instantaneous content-transition time matches the initially scheduled time.

As shown, the series of acts 500 includes an act 508 of the digital-content-transition system 106 providing the graphical effect transition to the digital display 108. For instance, depending on the type of graphical effect transition, the digital-content-transition system 106 can provide a graphical effect to the digital display 108 before or with the second visual media collection. For example, if the graphical effect transition is a logo or another visual media item/collection, the digital-content-transition system 106 can provide the graphical effect transition before providing the second visual media collection. Otherwise, if the graphical effect transition is a transition amination (e.g., a fade, slide, dissolve, or another animation transition) the digital-content-transition system 106 can provide the graphical effect with the second visual media collection to the digital display 108.

To illustrate, the series of acts 500 includes an act 510 of the digital-content-transition system 106 providing the second visual media collection at the content-transition time (e.g., the instantaneous content-transition time) to the digital display 108. In response, the digital display 108 transitions from the first visual media collection to the second visual media collection utilizing the graphical effect, as shown in an act 512 of the series of acts 500. Indeed, as shown, the act 512 can occur at the initially scheduled time.

Moreover, in various implementations, the digital-content-transition system 106 can provide the second visual media collection at the content-transition time and the digital display 108 can display the second visual media collection. In FIG. 5A, because the digital-content-transition system 106 determines the instantaneous content transition, the digital display 108 displays the second visual media collection without the first visual media collection finishing displaying. However, by utilizing a graphical effect, the transition or conversion between the first visual media collection and the second visual media collection is less abrupt and graceful to a viewing user.

To further illustrate, FIG. 5B shows a schematic timeline diagram of utilizing an instantaneous content transition at the digital-content-display device 102 in accordance with one or more implementations. As shown, FIG. 5B includes the digital-content-display device 102 initially displaying the first visual media collection 520 (e.g., "Collection A"), then later displaying the second visual media collection 522 (e.g., "Collection B"), where time is represented by a timeline across the bottom (e.g., the dark horizontal arrow).

As shown in FIG. 5B, the digital-content-display device 102 displays the first visual media collection at a scheduled time 524. For example, the digital-content-display device 102 displays the first visual media collection 520 upon starting up or beginning to display visual media included in a program schedule. Further, as shown by the arrow to the right of the first visual media collection 520, the first visual media collection 520 displays at the digital-content-display device 102 until the digital-content-display device 102 converts to the second visual media collection 522.

Based on determining the instantaneous content transition as the content-transition type and the instantaneous content-transition time as the content-transition time, the digital-content-display device 102 can convert the display at the digital-content-display device 102 at the initially scheduled time 526 or the instantaneous content-transition time 528 from the first visual media collection 520 to the second visual media collection 522. In this example, the digital-content-display device 102 instantaneously converts the display of the digital-content-display device 102 to the second visual media collection at the instantaneous content-transition time 528 even if the first visual media collection 520 has not yet finished displaying.

FIG. 5C illustrates a schematic timeline diagram of utilizing an instantaneous content transition with a graphical effect transition at the digital-content-display device 102 in accordance with one or more implementations. As shown, FIG. 5C includes the digital-content-display device 102 displaying the first visual media collection 520 (e.g., "Collection A"), then later displaying the second visual media collection 522 (e.g., "Collection B"), where time is represented by an arrow across the bottom.

As shown in FIG. 5C, the digital-content-transition system 106 also determines to include a graphical effect transition 530 along with the instantaneous content transition. Indeed, as shown, at the initially scheduled time 526 and the instantaneous content-transition time 528, the digital-content-display device 102 transitions from the first visual media collection 520 to the second visual media collection 522 utilizing the graphical effect transition 530.

In some implementations, the graphical effect transition 530 can start before the initially scheduled time 526, as shown by the dashed arrow to the left of the graphical effect transition 530. Indeed, as described above, the graphical effect transition 530 can commence at an advanced content-transition time that enables the graphical effect transition 530 to overlap with and seamlessly transition between the first visual media collection 520 and the second visual media collection 522 (or visual media items within the visual media collections).

Figure 6A:
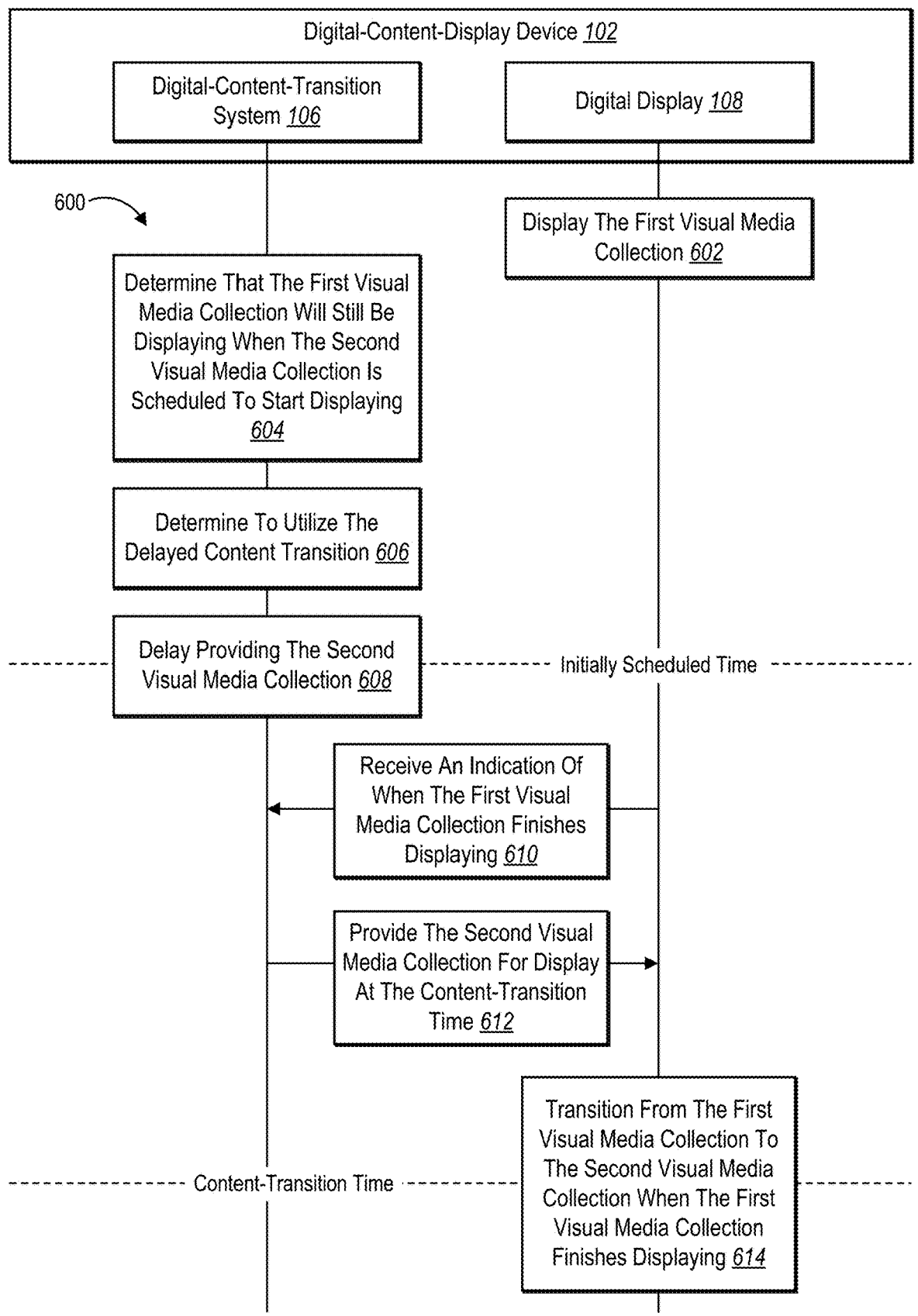
FIG. 6A illustrates a flow chart of a series of acts for utilizing a delayed content transition in accordance with one or more implementations.

FIG. 6A illustrates a flow chart of a series of acts 600 for utilizing a delayed content transition as the determined content-transition type in accordance with one or more implementations. As shown in FIG. 6A, the digital-content-display device 102 can implement the series of acts 600, and in particular, the digital-content-transition system 106 and the digital display 108 of the digital-content-display device 102 implement the series of acts 600.

As shown, the series of acts 600 includes an act 602 of the digital display 108 displaying the first visual media collection. In addition, the series of acts 600 includes an act 604 of the digital-content-transition system 106 determining that the first visual media collection will still be displaying when the second visual media collection is scheduled to start displaying. The acts 602 and 604 can mirror the acts 502 and 504 described above with respect to FIG. 5.

As also shown, the series of acts 600 includes an act 606 of the digital-content-transition system 106 determining to utilize the delayed content transition as the content-transition type. As described above, the digital-content-transition system 106 can determine to utilize the delayed content transition based on a number of factors. For example, the digital-content-transition system 106 can determine the delayed content transition as the content-transition type based on a first timing-priority value corresponding to the media-collection metadata of the first visual media collection being greater than a second timing-priority value corresponding to the media-collection metadata of the second visual media collection (or timing-priority value corresponding to the media-item metadata of a first visual media item and a second visual media item). Indeed, if the first visual media collection and the second visual media collection have the same timing-sensitivity value, the digital-content-transition system 106 may determine to wait for the first visual media collection to finish displaying before transitioning to the second visual media collection.

As shown, the series of acts 600 includes an act 608 of the digital-content-transition system 106 delaying or holding off on providing the second visual media collection to the digital display 108. For example, FIG. 6A shows the initially scheduled time when the second visual media collection was scheduled to start displaying at the digital display 108. However, because the digital-content-transition system 106 selects the delayed content transition as the content-transition type, the digital-content-transition system 106 holds off from providing the second visual media collection to the digital display 108 at the initially scheduled time.

Further, in some implementations, the digital-content-transition system 106 determines a content-transition time based on selecting the delayed content transition as the content-transition type. For example, the digital-content-transition system 106 determines a delayed content-transition time that corresponds to when the first visual media collection finishes displaying at the digital display 108. As described above, in some instances, the digital-content-transition system 106 calculates a future time as the content-transition time (e.g., a delayed content-transition time). In other instances, the delayed content transition sets the delayed content-transition time in real time or near-real time in response to detecting that the first visual media collection has finished displaying at the digital display 108.

To illustrate, as shown in FIG. 6A, the series of acts 600 includes an act 610 of the digital-content-transition system 106 receiving an indication of when the first visual media collection finishes displaying at the digital display 108. For example, the digital display 108 sends the digital-content-transition system 106 an indication of when the first visual media collection finishes displaying. In response, the digital-content-transition system 106 can determine the content-transition time (e.g., the delayed content-transition time) as the time when the first visual media item finishes displaying.

As shown, the series of acts 600 includes an act 612 of the digital-content-transition system 106 providing the second visual media collection to the digital display 108 at the content-transition time (e.g., the delayed content-transition time). Indeed, the digital-content-transition system 106 can delay providing the second visual media collection to the digital display 108 until the first visual media collection has finished playing.

In response, the digital display 108 converts from displaying the first visual media collection to displaying the second visual media collection at the content-transition time. As shown, the series of acts 600 includes an act 614 of the digital display 108, at the content-transition time, transitioning from the first visual media collection to the second visual media collection when the first visual media collection finishes displaying. In this manner, the digital-content-display device 102 displays the second visual media collection according to the determined content-transition type (e.g., the delayed content transition) at the content-transition time (e.g., the delayed content-transition time) such that the first visual media collection transitions smoothly and naturally to the second visual media collection.

As mentioned above, in some implementations, the digital-content-transition system 106 can determine to utilize the delayed content transition as the content-transition type where the digital-content-transition system 106 delays converting the digital display 108 from the first visual media collection to the second visual media collection until one or more visual media items in the first visual media collection finishes displaying. Accordingly, in these implementations, the digital-content-transition system 106 determines the content-transition time (e.g., the delayed content-transition time) as the time that the first visual media collection (or portion thereof) finishes displaying.

Figure 6B:
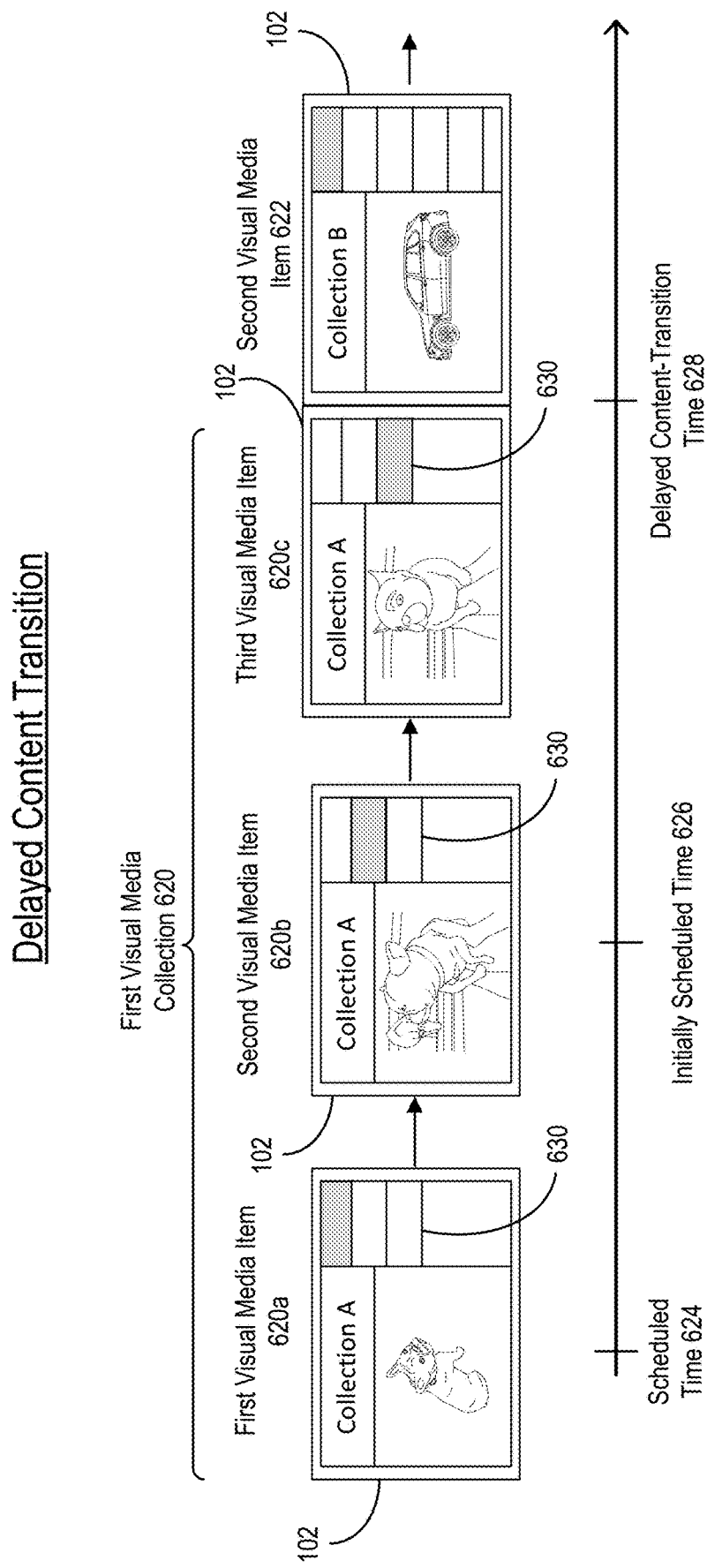
FIG. 6B illustrates a schematic diagram of a timeline for utilizing a delayed content transition at a digital-content-display device in accordance with one or more implementations.

To further illustrate, FIG. 6B shows a schematic timeline diagram of utilizing a delayed content transition at the digital-content-display device 102 in accordance with one or more implementations. FIG. 6B includes the digital-content-display device 102 initially displaying a first visual media collection 620 (e.g., "Collection A"), which includes a first visual media item 620a, a second visual media item 620b, and a third visual media item 620c, then later displaying the second visual media collection 622 (e.g., "Collection B"), where time is represented as a timeline across the bottom.

As shown, the digital-content-display device 102 displays the first visual media item 620a of the first visual media collection 620 at the scheduled time 624. For ease of explanation, the digital-content-display device 102 displays a list of visual media items 630 indicating that the first visual media collection 620 is playing the first visual media item in the collection. In some implementations, the first visual media collection 620 may be displayed and/or play multiple times at the digital-content-display device 102 (e.g., the digital-content-display device 102 displays multiple instances of the first visual media collection 620 on repeat or loop).

As the time approaches the initially scheduled time 626 where the second visual media collection 622 is scheduled to be displayed, the digital-content-transition system 106 can determine that the first visual media collection 620 has not finished displaying. To illustrate, FIG. 6B shows the second visual media item 620b of the first visual media collection 620 at the initially scheduled time 626. Indeed, the digital-content-display device 102 shows the list of visual media items 630 indicating the first visual media collection 620 includes additional visual media items not yet displayed.

Because the digital-content-transition system 106 determines the delayed content transition, the digital-content-transition system 106 does not display the second visual media collection 622 at the initially scheduled time 626. Rather the digital-content-transition system 106 waits for the first visual media collection 620 to finish displaying. As shown, FIG. 6B illustrates the digital-content-display device 102 displaying the third visual media item 620c of the first visual media collection 620, as represented by the list of visual media items 630 playing the last visual media item in the collection.

As described above, based on determining the delayed content transition as the content-transition type, the digital-content-transition system 106 can determine the delayed content-transition time to correspond to the end of the first visual media collection 620. Accordingly, upon the first visual media collection 620 finishing (e.g., detecting the finished third visual media item 620c), the digital-content-transition system 106 can provide the second visual media collection 622 for display at the digital-content-display device 102 at the delayed content-transition time 628. Accordingly, FIG. 6B shows the digital-content-display device 102 converting the display from the first visual media collection 620 to the second visual media collection 622 at the delayed content-transition time 628.

Figure 7A:
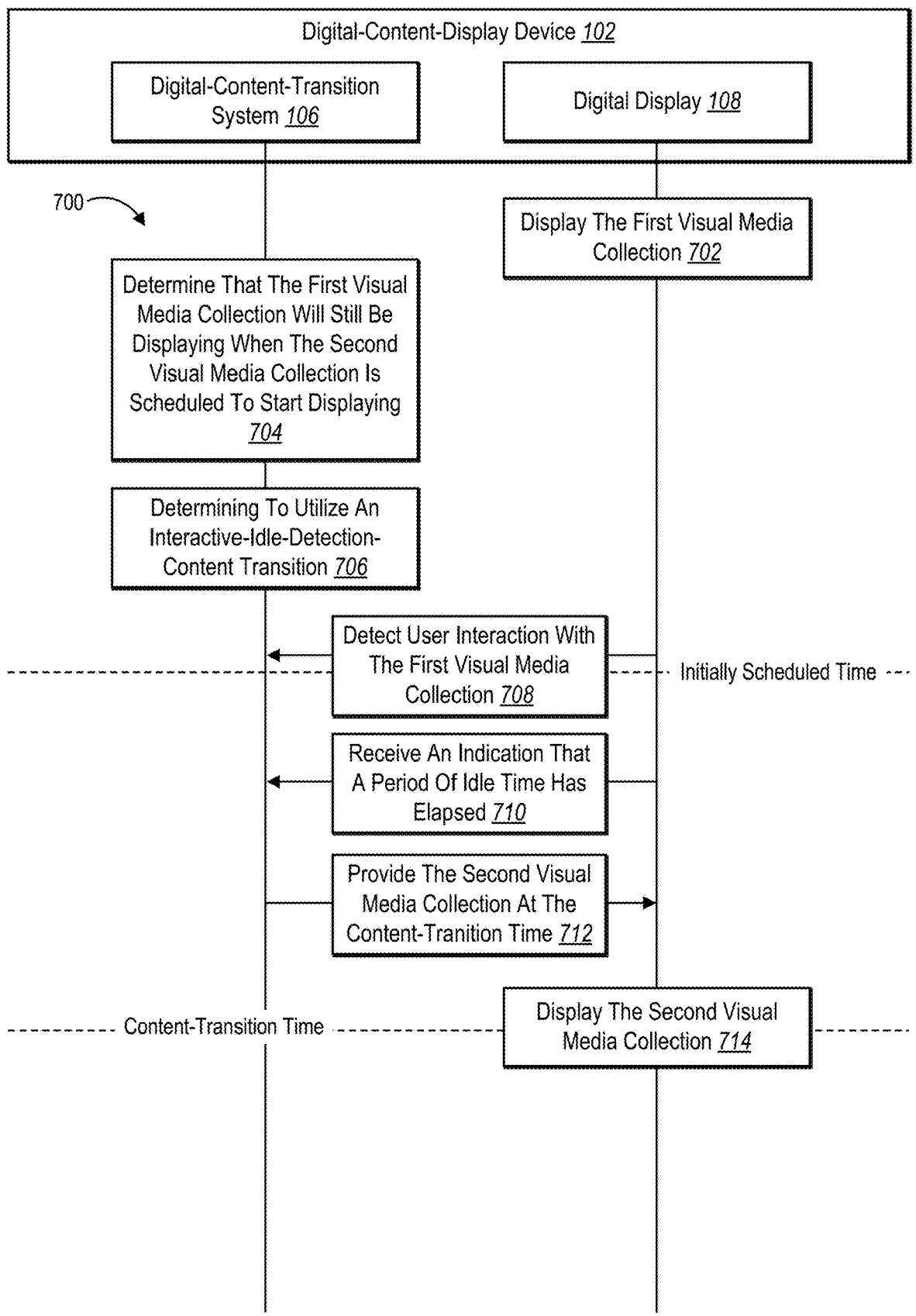
FIG. 7A illustrates a flow chart of a series of acts for utilizing an interactive content transition in accordance with one or more implementations.

FIG. 7A illustrates a flow chart of a series of acts 700 for utilizing an interactive content transition as the determined content-transition type in accordance with one or more implementations. As shown in FIG. 7A, the digital-content-display device 102 can implement the series of acts 700, and in particular, the digital-content-transition system 106 and the digital display 108 of the digital-content-display device 102 implement the series of acts 700.

As shown, the series of acts 700 includes an act 702 of the digital display 108 displaying the first visual media collection. In addition, the series of acts 700 includes an act 704 of the digital-content-transition system 106 determining that the first visual media collection will still be displaying when the second visual media collection is scheduled to start displaying (e.g., at the initially scheduled time). The acts 702 and 704 can mirror the acts 502 and 504 described above with respect to FIG. 5.

The series of acts 700 also includes an act 706 of the digital-content-transition system 106 determining to utilize an interactive-idle-detection-content transition. For instance, as described above, the digital-content-transition system 106 can select the interactive content transition from the set of content-transition types based on one or more factors. For example, the digital-content-transition system 106 determines to utilize the interactive content transition based on detecting that the first visual media collection includes interactive content (e.g., at least one of the visual media items within the first visual media collection includes interactive content).

As described above, the interactive content transition can include multiple variations or content-transition sub-types. For example, the digital-content-transition system 106 can determine an interactive-idle-detection-content transition or an interactive-countdown-content transition as the content-transition type. For purposes of explanation, FIGS. 7A-7B correspond to the interactive-idle-detection-content transition while FIGS. 8A-8B correspond to the interactive-countdown-content transition. Accordingly, in FIG. 7A, the act 706 can include the digital-content-transition system 106 determining to utilize the interactive-idle-detection-content transition.

As shown, the series of acts 700 includes the act 708 of the digital-content-transition system 106 detecting user interaction with the first visual media collection at (or just before) the initially scheduled time. For example, the digital-content-transition system 106 begins monitoring for user interactions three minutes (or another threshold time value) before the initially scheduled time. In one or more implementations, the digital display 108 provides an interaction notification and/or interaction timestamp of when a viewing user last interacts with the first visual media collection. In alternative implementations, the digital-content-transition system 106 hosts the interactive content and detects (e.g., directly or through one or more input devices such as a touchscreen or keypad) a user interaction near the initially scheduled time.

In response to detecting the user interaction, the digital-content-transition system 106 can postpone sending the second visual media collection to the digital display 108 for display at the initially scheduled time. Rather, based on utilizing the interactive-idle-detection-content transition, the digital-content-transition system 106 can begin identifying user interactions within a time period surrounding the initially scheduled time (e.g., from three minutes before to three minutes after). When user interaction is detected, the digital-content-transition system 106 can start or restart an idle timer (e.g., a content-transition timeout timer). As described above, if the idle timer elapses, the digital-content-transition system 106 can proceed to convert the first visual media collection to the second visual media collection.

More particularly, as shown, the series of acts 700 includes an act 710 of the digital-content-transition system 106 receiving an indication that a period of idle time has elapsed. In some implementations, the digital display 108 displays the idle timer and provides the idle detection notification to the digital-content-transition system 106. In alternative implementations, the digital-content-transition system 106 maintains the idle timer.

As described above, the digital-content-transition system 106 can generate a content-transition time based on the idle timer. For example, the digital-content-transition system 106 determines a delayed content-transition time that sets the content-transition time to match the expiration of the idle timer. If the idle timer resets before it expires due to detecting additional user interactions, the digital-content-transition system 106 can similarly reset the delayed content-transition time.

As further shown in FIG. 7A, the series of acts 700 includes an act 712 of the digital-content-transition system 106 providing the second visual media collection to the digital display 108 at the content-transition time (e.g., the delayed content-transition time). Indeed, the digital-content-transition system 106 can provide the second visual media collection to the digital display 108 when no user interactions have been detected at the digital-content-display device 102 for at least a minimum amount of time (e.g., measured by the idle timer).

In response, the digital display 108 converts from displaying the first visual media collection to displaying the second visual media collection at the content-transition time (e.g., the delayed content-transition time). As shown, the series of acts 700 includes an act 714 of the digital display 108 displaying the second visual media collection at the content-transition time. In this manner, the digital-content-display device 102 displays the second visual media collection according to the determined content-transition type (e.g., the interactive-idle-detection-content transition) at the content-transition time (e.g., the delayed content-transition time) such that the first visual media collection transitions naturally to the second visual media collection without interrupting a viewing user who is actively interacting with the digital-content-display device 102.

Figure 7B:
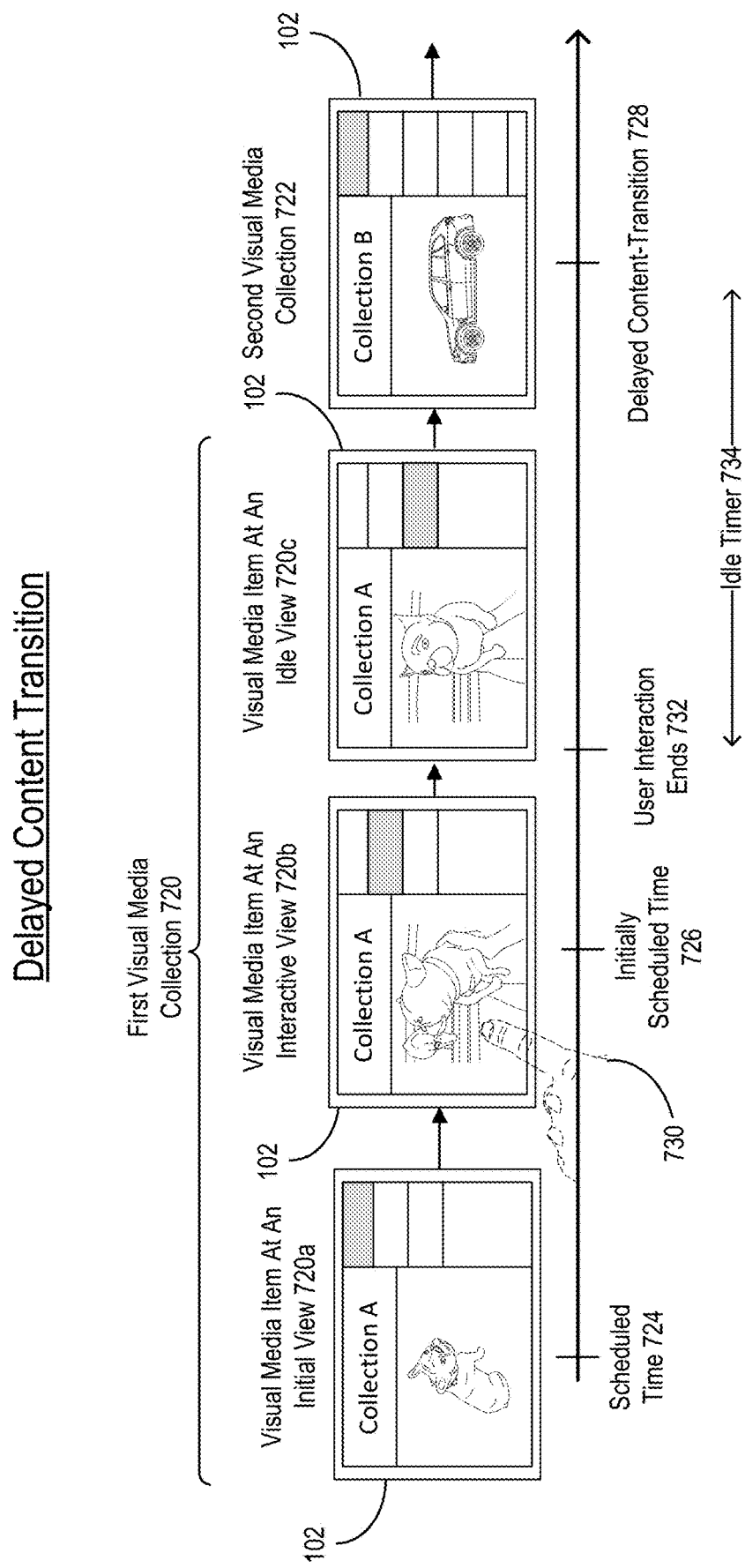
FIG. 7B illustrates a schematic diagram of a timeline for utilizing an interactive content transition at a digital-content-display device in accordance with one or more implementations.

To further illustrate, FIG. 7B shows a schematic timeline diagram of utilizing an interactive-idle-detection-content transition at the digital-content-display device 102 in accordance with one or more implementations. FIG. 7B includes the digital-content-display device 102 displaying the first visual media collection 720 (e.g., "Collection A"), which includes a visual media item at an initial view 720a, the visual media item at an interactive view 720b, and the visual media item at an idle view 720c, then later displaying the second visual media collection 722 (e.g., "Collection B"), where time is represented as a timeline across the bottom.

As shown, the digital-content-display device 102 displays the visual media item at the initial view 720a of the first visual media collection 720 at the scheduled time 724, as previously described. While being displayed at the digital-content-display device 102, the digital-content-transition system 106 can detect that a viewing user is interacting with the first visual media collection 720. For example, FIG. 7B shows the digital-content-display device 102 receiving a user interaction 730 with respect to the visual media item at the interactive view 720b.

In addition, the detected user interaction 730 occurs near (e.g., at or before) the initially scheduled time 726. As described above, the digital-content-transition system 106 can monitor the user interaction and initiate an idle timer 734 upon detecting a pause in user interactions. For example, the digital-content-transition system 106 restarts the idle timer 734 each time a user interaction is detected after the initially scheduled timer. To illustrate, FIG. 7B shows the user interaction ending 732 on the timeline and, in response, the digital-content-transition system 106 starting the idle timer 734.

While the idle timer 734 runs, the digital-content-display device 102 can display the visual media item at the idle view 720c. In some implementations, the digital-content-display device 102 displays a notification and/or announcement that the idle time (e.g., an inactive timeout timer) is running. In alternative implementations, the digital-content-display device 102 does not display any notice. If an additional user interaction is detected, the digital-content-transition system 106 can reset the idle timer 734.

Upon the idle timer 734 expiring, the digital-content-transition system 106 can provide the second visual media collection 722 for display at the digital-content-display device 102. Indeed, as described above, the digital-content-transition system 106 can set the delayed content-transition time 728 to correspond with the expiration of the idle timer 734 and provide the second visual media collection 722 at the delayed content-transition time 728, as described above.

Figure 8A:
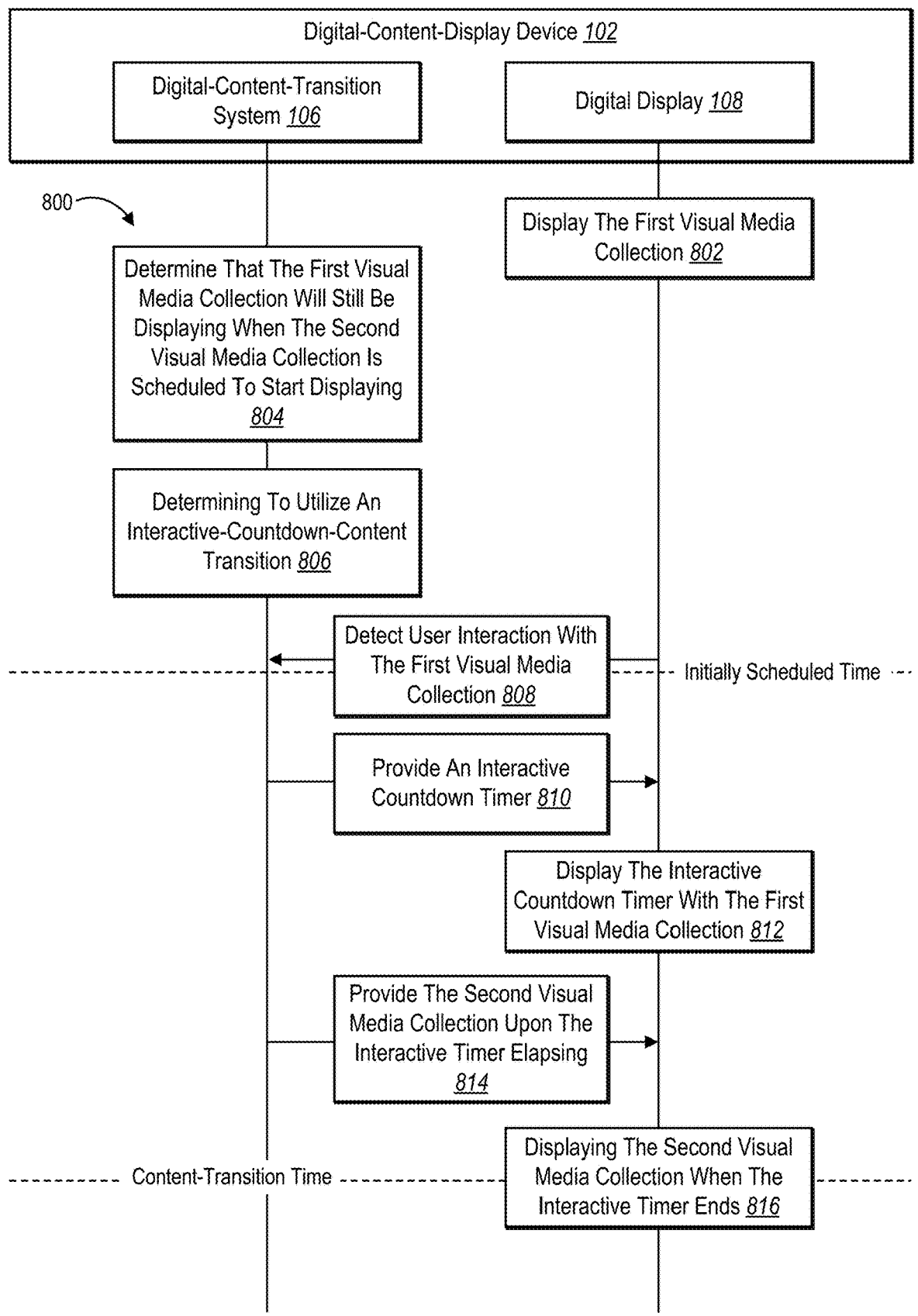
FIG. 8A illustrates a flow chart of a series of acts for utilizing another interactive content transition in accordance with one or more implementations.

FIG. 8A illustrates a flow chart of a series of acts 800 for utilizing another interactive content transition as the determined content-transition type in accordance with one or more implementations. As shown in FIG. 8A, the digital-content-display device 102 can implement the series of acts 800. In particular, the digital-content-transition system 106 and the digital display 108 of the digital-content-display device 102 implement the series of acts 800.

As shown, the series of acts 800 includes an act 802 of the digital display 108 displaying the first visual media collection. In addition, the series of acts 800 includes an act 804 of the digital-content-transition system 106 determining that the first visual media collection will still be displaying when the second visual media collection is scheduled to start displaying (e.g., at the initially scheduled time). The acts 802 and 804 can mirror the acts 502 and 504 described above with respect to FIG. 5.

The series of acts 800 also includes an act 806 of the digital-content-transition system 106 determining to utilize an interactive-countdown-content transition. As noted above with respect to the act 706 in FIG. 7A, for purposes of explanation, FIGS. 8A-8B correspond to the interactive-countdown-content transition. Accordingly, the act 806 in FIG. 8A can include the digital-content-transition system 106 determining to utilize the interactive-countdown-content transition as the content-transition type.

As shown, the series of acts 800 includes the act 808 of the digital-content-transition system 106 detecting user interaction with the visual media collection (at or before the initially scheduled time). For example, the digital-content-transition system 106 begins monitoring for user interactions at the initially scheduled time.

Based on the digital-content-transition system 106 detecting a user interaction at or near the initially scheduled time and based on utilizing the interactive-countdown-content transition, the digital-content-transition system 106 can implement an interactive countdown. To illustrate, the series of acts 800 includes an act 810 of the digital-content-transition system 106 providing an interactive countdown to the digital display 108.

In response, the digital display 108 can display the interactive countdown time to the viewing users engaging with the first visual media collection. As shown, the series of acts 800 includes an act 812 of the digital display 108 displaying the interactive countdown timer with the first visual media collection. For example, the digital display 108 overlays the interactive countdown timer over a portion of the first visual media collection. In additional implementations, the digital display 108 includes a notice, announcement, or warning (e.g., within a popup) that the experience with the first visual media collection will end upon the interactive countdown timer elapsing.

As shown, the series of acts 800 includes an act 814 of the digital-content-transition system 106 providing the second visual media collection upon the interactive countdown timer elapsing. Indeed, based on selecting the interactive-countdown-content transition, the digital-content-transition system 106 can set the content-transition type (e.g., a delayed content-transition type) to match when the interactive countdown timer expires. Accordingly, the digital-content-transition system 106 can provide the second visual media collection to the digital display 108 at the content-transition time (e.g., a delayed content-transition time), which also occurs when the interactive countdown timer elapses.

In response, the digital display 108 converts from displaying the first visual media collection to displaying the second visual media collection at the content-transition time (e.g., the delayed content-transition time). As shown, the series of acts 800 includes an act 816 of the digital display 108, at the content-transition time, displaying the second visual media collection when the interactive countdown timer ends. In this manner, the digital-content-display device 102 displays the second visual media collection according to the content-transition type (e.g., the interactive-countdown-content transition) at the content-transition time (e.g., the delayed content-transition time) such that a viewing user is provided with ample time to save their progress and/or gracefully conclude their experience with the first visual media collection.

To further illustrate, FIG. 8B shows a schematic timeline diagram of utilizing an interactive-countdown-content transition at the digital-content-display device 102 in accordance with one or more implementations. FIG. 8B includes the digital-content-display device 102 displaying the first visual media collection 820 (e.g., "Collection A"), which includes a first visual media item at an initial view 820a, the first visual media item at an interactive view 820b, and the first visual media item at a countdown-timer view 820c, then later displaying the second visual media collection 822 (e.g., "Collection B"), where time is represented as a timeline across the bottom.

As shown, the digital-content-display device 102 displays the first visual media item at the initial view 820a of the first visual media collection 820 at the scheduled time 824, as previously described. While being displayed at the digital-content-display device 102, the digital-content-transition system 106 can detect that a viewing user is interacting with the first visual media collection 820 at the initially scheduled time 824. For example, FIG. 8B shows the digital-content-display device 102 receiving a user interaction 830 with respect to the first visual media item at an interactive view 820b of the first visual media collection 820 at the initially scheduled time 826.

In response to detecting the user interaction 830 at the initially scheduled time 826, the digital-content-display device 102 can begin an interactive countdown timer 832. Further, as shown, the digital-content-display device 102 can display a countdown graphic 834 overlaid on the first visual media item at the countdown-timer view 820c of the first visual media collection 820 indicating the interactive countdown timer 832. The first visual media item at the countdown-timer view 820c can further provide notice that the first visual media collection 820 will end when the interactive countdown timer 832 expires.

While the interactive countdown timer 832 runs, the digital-content-display device 102 can update the countdown graphic 834 (e.g., show clock a or timer counting down). Then, upon the interactive countdown timer 832 expiring, the digital-content-transition system 106 can provide the second visual media collection 822 for display at the digital-content-display device 102. Indeed, as described above, the digital-content-transition system 106 can set the delayed content-transition time 828 to correspond with the expiration of the interactive countdown timer 832 and provide the second visual media collection 822 at the delayed content-transition time 828. In some implementations, the digital-content-display device 102 displays a graphical effect (e.g., a graphical effect transition) as part of converting to the second visual media collection 822 at the delayed content-transition time 828.

Figure 9:
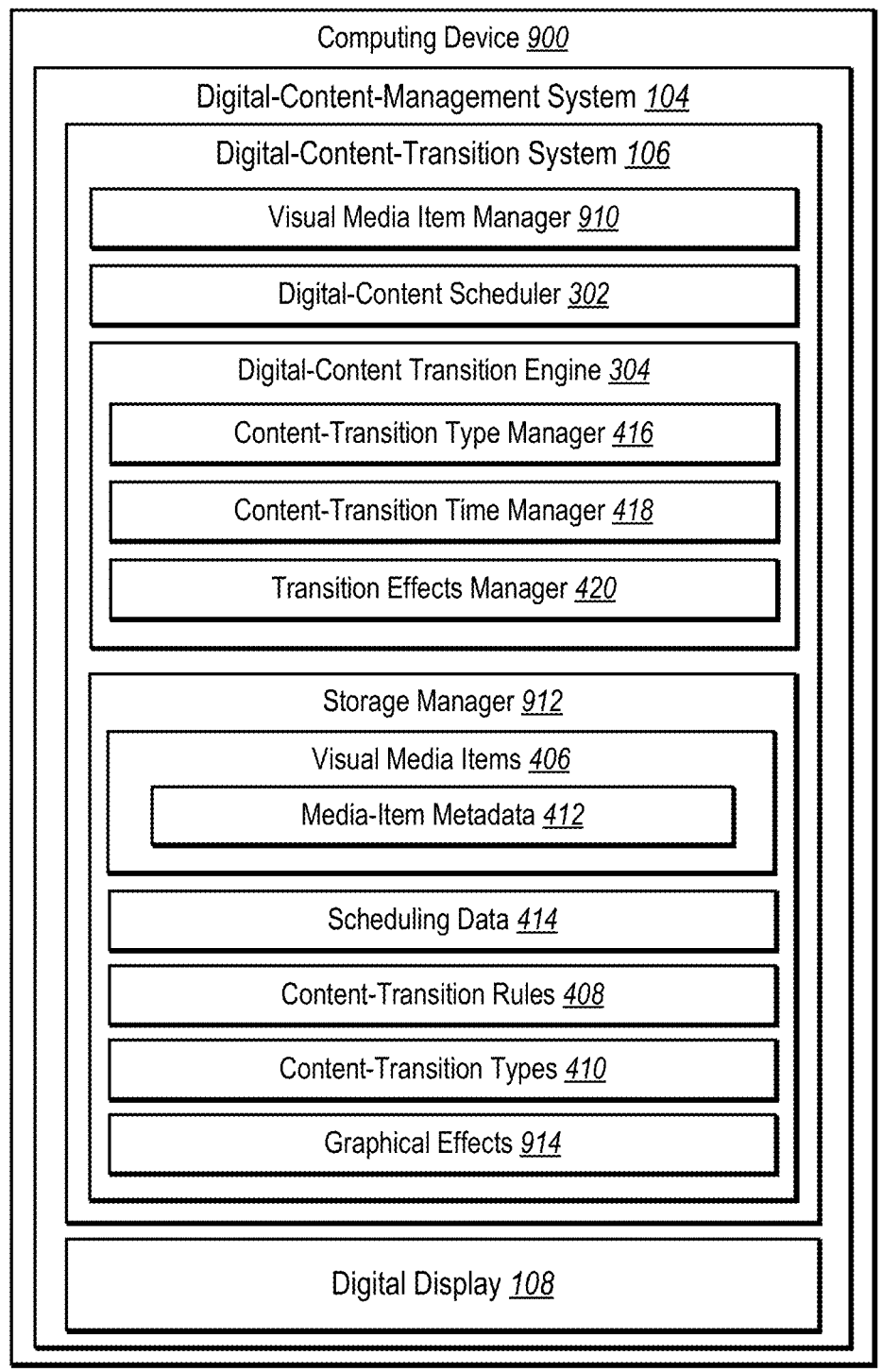
FIG. 9 illustrates a schematic diagram of the digital-content-transition system in accordance with one or more implementations.

Referring now to FIG. 9, additional detail is provided regarding the capabilities and components of the digital-content-transition system 106 in accordance with one or more implementations. In particular, FIG. 9 shows a schematic diagram of an example architecture of the digital-content-transition system 106 implemented within the digital-content-management system 104 and hosted on a computing device 900. The digital-content-management system 104 can correspond to the digital-content-management system 104.

As shown, the digital-content-transition system 106 is located on a computing device 900 along with the digital display 108. In general, the computing device 900 may represent various types of computing devices. For example, in some implementations, the computing device 900 is a non-mobile device, such as a digital billboard, digital marquee, digital menu board, kiosk, server, desktop, or another non-mobile client device. In other implementations, the computing device 900 is a laptop, tablet, mobile telephone, smartphone, etc. Additional details with regard to the computing device 900 are discussed below with respect to FIG. 11.

As illustrated in FIG. 9, the digital-content-transition system 106 includes various components for performing the processes and features described herein. Many of the components have been previously described above. For example, the digital-content-transition system 106 includes a visual media item manager 910, a digital-content scheduler 302, a digital-content-transition engine 304, and a storage manager 912. As shown, the digital-content-transition engine 304 includes the content-transition type manager 416, the content-transition time manager 418, and the transition effect manager 420. As also shown, the storage manager 912 includes the visual media items 406 having media-item metadata 412, scheduling data 414, content-transition rules 408, content-transition types 410, and graphical effects 914.

As mentioned above, the digital-content-transition system 106 includes a visual media item manager 910. In general, the visual media item manager 910 facilitates identifying, accessing, receiving, obtaining, generating, importing, exporting, copying, modifying, removing, and organizing visual media items 406. For example, the visual media item manager 910 facilitates the creation of visual media collections from multiple visual media items 406. In one or more implementations, the visual media item manager 910 communicates with the storage manager 912 to store and retrieve the visual media items 406, for example, to provide the digital display 108 with access to a target visual media item.

In addition, the visual media item manager 910 can facilitate the management of media-item metadata 412 associated with the visual media items 406. For example, the visual media item manager 910 can generate, update, remove, and/or modify media-item metadata 412 for one or more of the visual media items 406. In some implementations, the visual media item manager 910 can track, organize, store, search, access, and/or retrieve visual media items 406 based on media-item metadata 412 associated with the visual media items 406.

As shown, the digital-content-transition system 106 includes the digital-content scheduler 302. As described above, the digital-content scheduler 302 facilitates creating, receiving, generating, importing, exporting, copying, modifying, removing, and organizing scheduling data 414. For example, the digital-content scheduler 302 surfaces and/or provides timer events that indicate when the next visual media item and/or visual media collection is to be displayed at the digital display 108. Further, the digital-content scheduler 302 can provide a program schedule that includes scheduling data 414 for each visual media item (or visual media collection) to be displayed within the corresponding time period (e.g., an hourly, weekly, or monthly program schedule).

As shown, the digital-content-transition system 106 includes the digital-content-transition engine 304. As described above, the digital-content-transition engine 304 (e.g., an orchestration engine) can determine a content-transition type to execute from a set of content-transition types 410 as well as a content-transition time of when to execute a content transition or content takeover (i.e., content conversion) between two visual media items.

As mentioned, the digital-content-transition engine 304 includes the content-transition type manager 416, the content-transition time manager 418, and the transition effect manager 420, each of which is described in detail above with respect to FIG. 4. As a summary, the content-transition type manager 416 can determine a content-transition type from the set of content-transition types 410 based on the media-item metadata 412 from the visual media items 406, scheduling data 414 from the digital-content scheduler 302, and/or the content-transition rules 408. The content-transition time manager 418 can determine a content-transition time (e.g., an instantaneous content-transition time or a delayed content-transition time) from the determined content-transition type and/or an initially scheduled time where the content-transition time indicates a time to display to start displaying a visual media item at the digital display 108. The transition effect manager 420 can determine when to apply a graphical effect to a content transition as well as which of the graphical effects 914 to apply. Examples of graphical effects 914 include, but are not limited to, animations transitioning between two visual media items (e.g., dissolving, fading, sliding, bouncing, zooming) or inserting a graphic (e.g., a logo or mark).

Each of the components shown in FIG. 9 within the digital-content-transition system 106 can include software, hardware, or both. For example, the components can include one or more instructions stored on a computer-readable storage medium and executable by processors of one or more computing devices, such as a client device (e.g., a mobile client device) or server device. When executed by the one or more processors, the computer-executable instructions of the digital-content-transition system 106 can cause a computing device to perform the feature learning methods described herein. Alternatively, the components can include hardware, such as a special-purpose processing device to perform a certain function or group of functions. In addition, the components of the digital-content-transition system 106 can include a combination of computer-executable instructions and hardware.

Furthermore, the components shown in FIG. 9 within the digital-content-transition system 106 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE® CREATIVE CLOUD®, ADOBE® PRIMETIME®, and ADOBE® SPARK® software. "ADOBE," "CREATIVE CLOUD," "PRIMETIME," and "SPARK" are either registered trademarks or trademarks of Adobe Inc. in the United States and/or other countries.

FIGS. 1-9, the corresponding text, and the examples provide a number of different methods, systems, devices, and non-transitory computer-readable media of the digital-content-transition system 106. Additionally, the acts described herein may be repeated or performed in parallel with one another or parallel with different instances of the same or similar acts.

Figure 10:
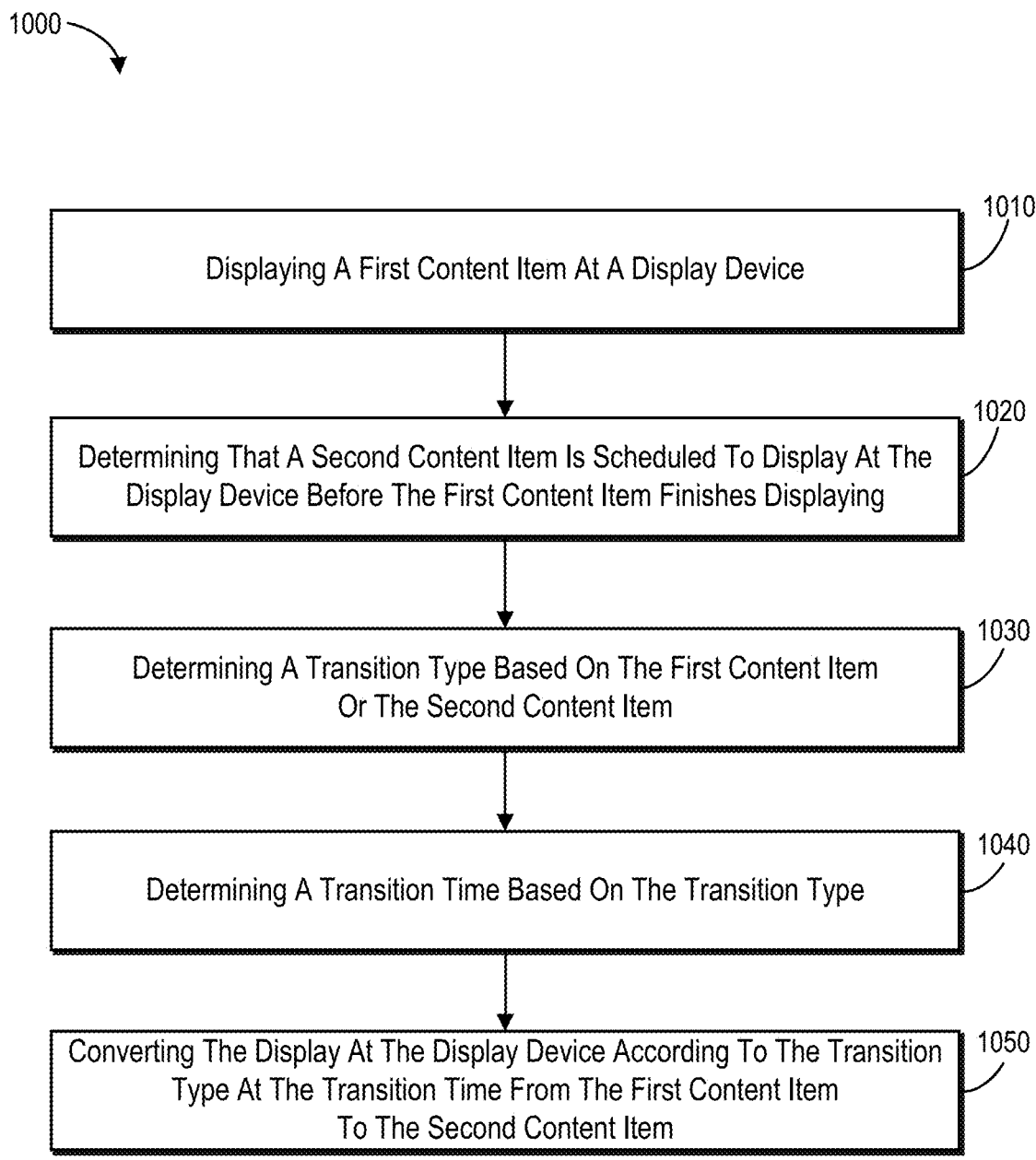
FIG. 10 illustrates a flowchart of a series of acts of transitioning between visual media items at a digital-content-display device in accordance with one or more implementations.

As mentioned, FIG. 10 illustrates a flowchart of a series of acts in accordance with one or more implementations. While FIG. 10 illustrates acts according to one implementation, alternative implementations may omit, add to, reorder, and/or modify any of the acts shown. The acts of FIG. 10 can be performed as part of a method. Alternatively, a non-transitory computer-readable medium can comprise instructions that, when executed by one or more processors, cause a computing device to perform the acts of FIG. 10. In some implementations, a system can perform the acts of FIG. 10.

To illustrate, FIG. 10 shows a flowchart of a series of acts 1000 of transitioning between visual media items at a digital-content-display device in accordance with one or more implementations. In various implementations, the series of acts 1000 is implemented on one or more computing devices, such as the digital-content-display device 102, the client device 110, the server device 112, or the computing device 900. In addition, in some implementations, the series of acts 1000 is implemented in a digital environment for displaying visual media items at a digital-content-display device. For example, the series of acts 1000 is implemented on one or more computing devices having a memory that includes a first visual media item and corresponding media-item metadata, a second visual media item and corresponding media-item metadata, a set of content-transition types, one or more content-transition rules, and graphical effects.

The series of acts 1000 includes an act 1010 of displaying a first content item at a display device. In particular, the act 1010 can involve displaying a first visual media item at a digital-content-display device. In various implementations, the act 1010 can include displaying a video or an image as the first visual media item for a set duration at the digital-content-display device. In one or more implementations, the digital-content-display device 102 is a digital billboard, a digital marquee, a digital kiosk, or a digital menu board.

As shown, the series of acts 1000 also includes an act 1020 of determining that a second content item is scheduled to display at the display device before the first content item finishes displaying. In particular, the act 1020 can involve determining that a second visual media item is scheduled to display at the digital-content-display device before the first visual media item finishes displaying at the digital-content-display device. In one or more implementations, the act 1020 can include comparing scheduling data for the digital-content-display device to a completion indicator for the first visual media collection. In some implementations, the act 1020 includes comparing a first media-collection-metadata set corresponding to the first visual media collection to a second media-collection-metadata set corresponding to the second visual media collection to determine a timing priority (e.g., timing-priority values) between the first visual media collection and the second visual media collection.

As shown in FIG. 10, the series of acts 1000 further includes an act 1030 of determining a transition type based on the first content item or the second content item. In particular, the act 1030 can include determining a content-transition type from a set of content-transition types based on media-item metadata corresponding to the first visual media item or the second visual media item in response to the second visual media item being scheduled to display before the first visual media item finishes displaying. In one or more implementations, the act 1030 includes identifying the content-transition type from a set of content-transition types based on the timing priority.

In some implementations, the act 1030 includes determining an instantaneous content transition, a delayed content transition, an interactive content transition, or a graphical effect transition as the content-transition type. In various implementations, the act 1030 includes determining a delayed content transition as the content-transition type from the set of content-transition types. In example implementations, the act 1030 includes determining a graphical effect transition as the content-transition type from the set of content-transition types. In a number of implementations, the act 1030 includes identifying a delayed content transition as the content-transition type from the set of content-transition types based on determining that a first timing-priority value for the first visual media collection is equal to or greater than a second timing-priority value for the second visual media collection.

In various implementations, the act 1030 can include determining a delayed content transition as the content-transition type from the set of content-transition types based on a first timing-priority value corresponding to the media-item metadata of the first visual media item being greater than a second timing-priority value corresponding to the media-item metadata of the second visual media item. In one or more implementations, the act 1030 can include determining an instantaneous content transition as the content-transition type from the set of content-transition types based on a first timing-priority value corresponding to the media-item metadata of the first visual media item being less than a second timing-priority value corresponding to the media-item metadata of the second visual media item. In some implementations, the act 1030 can include determining an interactive content transition as the content-transition type based on detecting a user interaction at the digital-content-display with the first visual media item.

As shown, the series of acts 1000 also includes an act 1040 of determining a transition time based on the transition type. In particular, the act 1040 can include determining a content-transition time for transitioning the display at the digital-content-display device from the first visual media item to the second visual media item based on the content-transition type in response to the second visual media item being scheduled to display before the first visual media item finishes displaying. In a number of implementations, the act 1040 includes determining that the content-transition time occurs at or after the initially scheduled time.

In one or more implementations, the act 1040 includes determining the content-transition time based on the content-transition type and the initially scheduled time. For example, in some implementations, the act 1040 includes determining an instantaneous content-transition time based on determining the instantaneous content transition as the content-transition type. In various implementations, the act 1040 includes determining a delayed content transition or a graphical effect transition as the content-transition type from the set of content-transition types and determining a delayed content-transition time based on the delayed content transition or the graphical effect transition.

As shown, the series of acts 1000 also includes an act 1050 of converting the display at the display device according to the transition type at the transition time from the first content item to the second content item. In particular, the act 1050 can include converting the display at the digital-content-display device according to the content-transition type at the content-transition time from the first visual media item to the second visual media item. In some implementations, the act 1050 includes converting the display at the digital-content-display device by converting the display from the first visual media item as part of a visual media collection (e.g., a visual media collection or visual media playlist) to the second visual media item.

In some implementations, based on determining the delayed content transition as the content-transition type, the act 1050 can include converting the display at the digital-content-display device according to the delayed content transition by delaying the display of the second visual media item until after the first visual media item finishes displaying. In a number of implementations, based on determining the delayed content transition as the content-transition type, the act 1050 can include converting the display at the digital-content-display device according to the delayed content transition by delaying the display of the second visual media item until after the first visual media item finishes displaying.

In various implementations, based on determining the graphical effect transition as the content-transition type, the act 1050 can include converting the display at the digital-content-display from the first visual media item to the second visual media item by adding graphical effect transition in connection with converting from the first visual media item to the second visual media item. In some implementations, the graphical effect transition includes a transition animation, an added graphic, or a third visual media item In one or more implementations, based on determining the instantaneous content transition as the content-transition type, the act 1050 can include converting the display at the digital-content-display device according to the instantaneous content transition by displaying the second visual media item at an initially scheduled time before the first visual media item finishes displaying.

The series of acts 1000 can also include a number of additional acts. In one or more implementations, the series of acts 1000 can include the acts of determining an interactive content transition as the content-transition type from the set of content-transition types; detecting a user interaction at the digital-content-display when the second visual media item is scheduled to display at the digital-content-display; and based on detecting the user interaction, convert the display at the digital-content-display device from the first visual media item to the second visual media item after an idle time period elapses without additional user interactions at the digital-content-display.

In some implementations, the series of acts 1000 can include the acts of determining an interactive content transition as the content-transition type from the set of content-transition types; determining the content-transition time by initiating an interaction countdown timer when the second visual media item is scheduled to display at the digital-content-display; and converting the display at the digital-content-display from the first visual media item to the second visual media item after the interaction countdown timer elapses.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions implemented in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general-purpose or special-purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. As used herein, the term "cloud computing" refers to a model for enabling on-demand network access to a shared pool of configurable computing resources. For example, cloud computing can be utilized in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is utilized.

Figure 11:
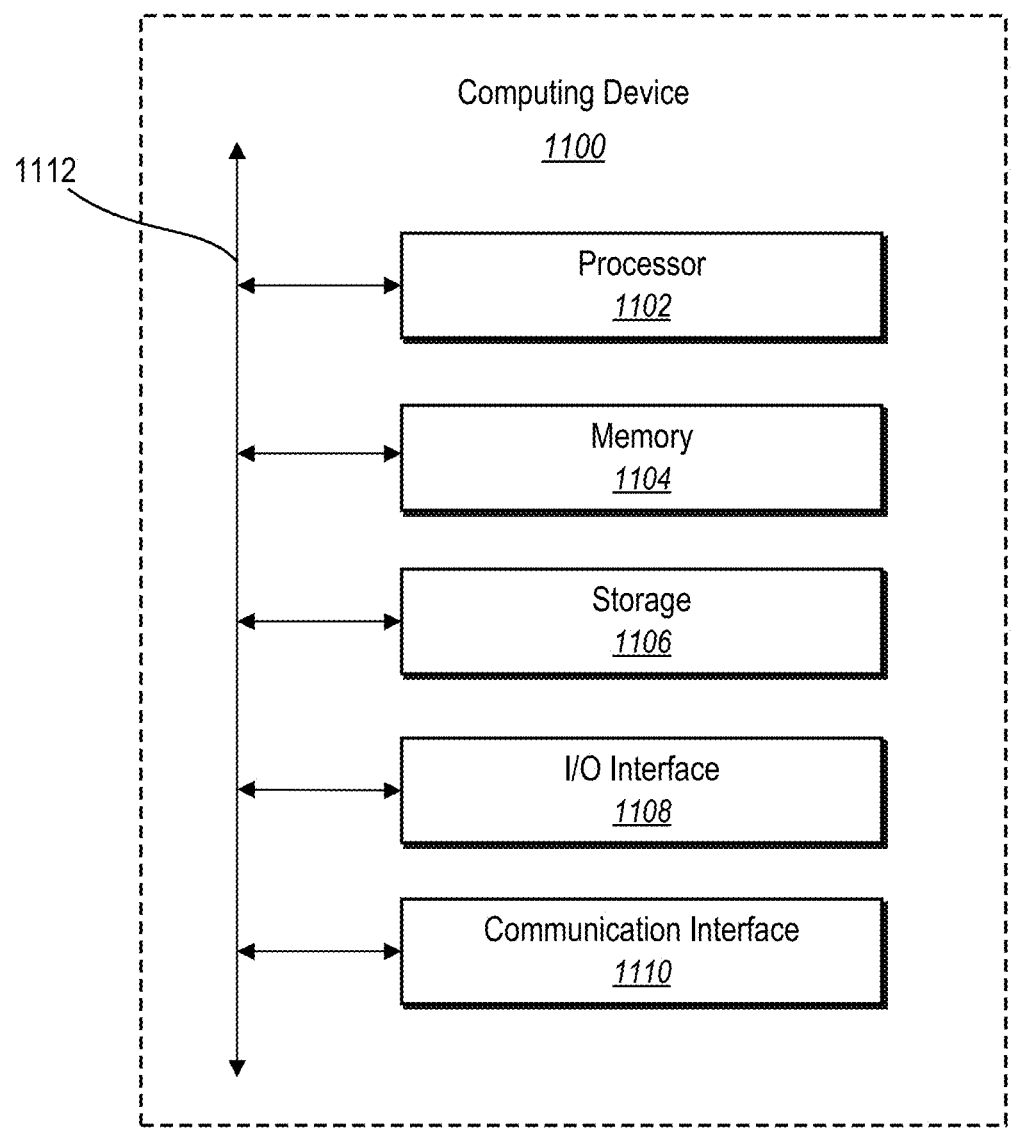
FIG. 11 illustrates a block diagram of an example computing device for implementing one or more implementations of the present disclosure.

FIG. 11 illustrates a block diagram of a computing device 1100 that may be configured to perform one or more of the processes described above. One will appreciate that one or more computing devices, such as the computing device 1100 may represent the computing devices described above (e.g., digital-content-display device 102, the client device 110, the server device 112, or the computing device 900). In one or more implementations, the computing device 1100 may be a mobile device (e.g., a laptop, a tablet, a smartphone, a mobile telephone, a camera, a tracker, a watch, a wearable device, etc.). In some implementations, the computing device 1100 may be a non-mobile device (e.g., a desktop computer, a server device, a web server, a file server, a social networking system, a program server, an application store, or a content provider). Further, the computing device 1100 may be a server device that includes cloud-based processing and storage capabilities.

As shown in FIG. 11, the computing device 1100 can include one or more processor(s) 1102, memory 1104, a storage device 1106, I/O interfaces 1108 (i.e., input/output interfaces), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other implementations. Furthermore, in certain implementations, the computing device 1100 includes fewer components than those shown in FIG.

11. Components of the computing device 1100 shown in FIG. 11 will now be described in additional detail.

In particular implementations, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive, or a combination of these or other storage devices.

As shown, the computing device 1100 includes one or more I/O interfaces 1108, which are provided to allow a user to provide input to (e.g., user strokes), receive output from, and otherwise transfer data to and from the computing device 1100. These I/O interfaces 1108 may include a mouse, keypad or a keyboard, a touch screen, camera, optical scanner, network interface, modem, other known I/O devices, or a combination of these I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be implemented in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a digital-content-display device to:
    display, at the digital-content-display device, a first visual media item corresponding to first media-item metadata;
    receive scheduling data comprising an initially scheduled time for a second visual media item and second media-item metadata of the second visual media item;
    determine that displaying the second visual media item beginning at the initially scheduled time would interrupt a current display of the first visual media item;
    based on the scheduling data and determining that displaying the second visual media item beginning at the initially scheduled time would interrupt the current display of the first visual media item:
        analyze the first media-item metadata of the first visual media item and the second media-item metadata of the second visual media item to determine in real time a timing priority between the first visual media item and the second visual media item based on a first timing-priority value for the first visual media item and a second timing-priority value for the second visual media item;
        determine in real time a content-transition type from a set of content-transition types for transitioning between the first visual media item and the second visual media item based on the timing priority between the first visual media item and the second visual media item; and
        determine a content-transition time for transitioning the display at the digital-content-display device from the first visual media item to the second visual media item based on the content-transition type; and
    convert the display at the digital-content-display device according to the content-transition type at the content-transition time from the first visual media item to the second visual media item.

2. The non-transitory computer-readable medium of claim 1, further comprising instructions that, when executed by the at least one processor, cause the digital-content-display device to determine in real time the content-transition type from the set of content-transition types by determining an instantaneous content transition, a delayed content transition, an interactive content transition, or a graphical effect transition as the content-transition type.

3. The non-transitory computer-readable medium of claim 1, further comprising instructions that, when executed by the at least one processor, cause the digital-content-display device to:

determine in real time the content-transition type from the set of content-transition types by determining a delayed content transition from the set of content-transition types; and determine the content-transition time for transitioning the display at the digital-content-display device by determining a delayed content-transition time based on the delayed content transition.

4. The non-transitory computer-readable medium of claim 1, further comprising instructions that, when executed by the at least one processor, cause the digital-content-display device to:

determine a delayed content transition as the content-transition type from the set of content-transition types; and convert the display at the digital-content-display device according to the delayed content transition by delaying the display of the second visual media item until after the first visual media item finishes displaying.

5. The non-transitory computer-readable medium of claim 1, further comprising instructions that, when executed by the at least one processor, cause the digital-content-display device to:

determine an interactive content transition as the content-transition type from the set of content-transition types;

detect a user interaction at the digital-content-display device when the second visual media item is scheduled to display at the digital-content-display device; and based on detecting the user interaction, convert the display at the digital-content-display device from the first visual media item to the second visual media item after an idle time period elapses without additional user interactions at the digital-content-display device.

6. The non-transitory computer-readable medium of claim 1, further comprising instructions that, when executed by the at least one processor, cause the digital-content-display device to:

determine an interactive content transition as the content-transition type from the set of content-transition types;

determine the content-transition time by initiating an interaction countdown timer when the second visual media item is scheduled to display at the digital-content-display device; and convert the display at the digital-content-display device from the first visual media item to the second visual media item after the interaction countdown timer elapses.

7. The non-transitory computer-readable medium of claim 1, further comprising instructions that, when executed by the at least one processor, cause the digital-content-display device to:

determine a graphical effect transition as the content-transition type from the set of context-transition types; and convert the display at the digital-content-display device from the first visual media item to the second visual media item by adding the graphical effect transition comprising an animation, a graphic, or a third visual media item in connection with converting from the first visual media item to the second visual media item.

8. The non-transitory computer-readable medium of claim 1, further comprising instructions that, when executed by the at least one processor, cause the digital-content-display device to:

determine a delayed content transition as the content-transition type from the set of content-transition types based on the first timing-priority value having a higher timing-priority value than the second timing-priority value; and convert the display at the digital-content-display device according to the delayed content transition by delaying the display of the second visual media item until after the first visual media item finishes displaying.

9. The non-transitory computer-readable medium of claim 1, further comprising instructions that, when executed by the at least one processor, cause the digital-content-display device to:

determine an instantaneous content transition as the content-transition type from the set of content-transition types based on the first timing-priority value being less than the second timing-priority value; and convert the display at the digital-content-display device according to the instantaneous content transition by displaying the second visual media item at the initially scheduled time before the first visual media item finishes displaying.

10. The non-transitory computer-readable medium of claim 1, further comprising instructions that, when executed by the at least one processor, cause the digital-content-display device to display the first visual media item in a loop at the digital-content-display device until the initially scheduled time, wherein displaying the second visual media item beginning at an initially scheduled time would interrupt finishing the loop of the first visual media item.

11. The non-transitory computer-readable medium of claim 1, further comprising instructions that, when executed by the at least one processor, cause the digital-content-display device to convert the display at the digital-content-display device by converting the display from the first visual media item as part of a visual media collection to the second visual media item.

12. A system comprising:

at least one memory device comprising a first visual media collection, a second visual media collection, and a set of content-transition types; and at least one computing device configured to cause the system to:

display, at a digital-content-display device, the first visual media collection corresponding to a first media-collection-metadata set;

receive scheduling data comprising an initially scheduled time for the second visual media collection and a second media-collection-metadata set of the second visual media collection;

determine that displaying the second visual media collection beginning at an initially scheduled time would interrupt a current display of the first visual media collection at the digital-content-display device;

based on the scheduling data and determining that displaying the second visual media collection beginning at the initially scheduled time would interrupt the current display of the first visual media collection, determine a content-transition type and a content-transition time for transitioning the display at the digital-content-display device from the first visual media collection to the second visual media collection by:

comparing the first media-collection-metadata set of the first visual media collection to the second media-collection-metadata set of the second visual media collection to determine in real time a timing priority between the first visual media collection and the second visual media collection based on a first timing-priority value for the first visual media collection and a second timing-priority value for the second visual media collection;
   identifying in real time the content-transition type from a set of content-transition types based on the timing priority; and
   determining the content-transition time based on the content-transition type and the initially scheduled time; and
convert the display at the digital-content-display device according to the content-transition type at the content-transition time from the first visual media collection to the second visual media collection.

13. The system of claim 12, wherein the at least one computing device is configured to identify in real time the content-transition type from the set of content-transition types by identifying one or more of an instantaneous content transition, a delayed content transition, an interactive content transition, or a graphical effect transition.

14. The system of claim 12, wherein the at least one computing device is configured to determine the content-transition time based on the content-transition type by:
   determining an instantaneous content transition as the content-transition type from the set of content-transition types; and
   determining an instantaneous content-transition time based on the instantaneous content transition.

15. The system of claim 12, wherein the at least one computing device is configured to determine that displaying the second visual media collection beginning at an initially scheduled time would interrupt the current display of the first visual media collection at the digital-content-display device in part by comparing the scheduling data to a completion indicator for the first visual media collection.

16. The system of claim 12, wherein the at least one computing device is configured to:
   determine that the first timing-priority value for the first visual media collection is equal to or greater than the second timing-priority value for the second visual media collection; and
   identify a delayed content transition as the content-transition type from the set of content-transition types based on the first timing-priority value being equal to or greater than the second timing-priority value.

17. The system of claim 12, wherein the at least one computing device is configured to display the first visual media collection at a digital billboard, a digital marquee, a digital kiosk, or a digital menu board as the digital-content-display device.

18. The system of claim 12, wherein the at least one computing device is configured to determine the content-transition time further based on a graphical effect comprising an animation, a graphic, or a third visual media item.

19. In a digital medium environment for displaying visual media items at a digital-content-display device, a computer-implemented method for transitioning between the visual media items at the digital-content-display device, the computer-implemented method comprising:
   displaying a first visual media item at the digital-content-display device;
   a step for determining a content-transition type between the first visual media item and a second visual media item at the digital-content-display device; and
   converting a display at the digital-content-display device according to the content-transition type from the first visual media item to the second visual media item.

20. The computer-implemented method of claim 19, further comprising determining an interactive content transition as the content-transition type based on detecting a user interaction at the digital-content-display device with the first visual media item.

* * * * *